US012596323B2

(12) United States Patent
Iriyama et al.

(10) Patent No.: US 12,596,323 B2
(45) Date of Patent: Apr. 7, 2026

(54) IMAGE FORMING APPARATUS HAVING GUIDES FOR INSTALLATION AND REMOVAL OF A REMOVAL UNIT

(71) Applicant: BROTHER KOGYO KABUSHIKI KAISHA, Nagoya (JP)

(72) Inventors: Shota Iriyama, Toyokawa (JP); Yasuhiro Suzuki, Nagoya (JP); Daisuke Ishizuka, Nagoya (JP); Misato Osuka, Nagoya (JP); Shuhei Fukue, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 1 day.

(21) Appl. No.: 18/607,797

(22) Filed: Mar. 18, 2024

(65) Prior Publication Data

US 2024/0310773 A1 Sep. 19, 2024

(30) Foreign Application Priority Data

Mar. 17, 2023 (JP) ................................ 2023-043116
Mar. 17, 2023 (JP) ................................ 2023-043117
Mar. 17, 2023 (JP) ................................ 2023-043118

(51) Int. Cl.
*G03G 15/00* (2006.01)
*G03G 15/20* (2006.01)
*G03G 21/16* (2006.01)

(52) U.S. Cl.
CPC ....... *G03G 15/657* (2013.01); *G03G 15/2064* (2013.01); *G03G 15/80* (2013.01); *G03G 21/1685* (2013.01); *G03G 2215/0872* (2013.01)

(58) Field of Classification Search
CPC ........... G03G 21/1685; G03G 21/1619; G03G 21/1647; G03G 21/1652
See application file for complete search history.

(56) References Cited

U.S. PATENT DOCUMENTS 12,429,800 B2 * 9/2025 Iriyama .............. G03G 21/1685
2021/0278801 A1 * 9/2021 Ishii .................. G03G 21/1652
2022/0260942 A1 8/2022 Furusawa

FOREIGN PATENT DOCUMENTS

JP H11-144801 A 5/1999
JP 2000-356938 A 12/2000
JP 2007-280839 A 10/2007

(Continued)

*Primary Examiner* — Arlene Heredia Ocasio
(74) *Attorney, Agent, or Firm* — Scully, Scott, Murphy & Presser, P.C.

(57) ABSTRACT

An image forming apparatus includes a main frame and a unit installable in an installation position in the main frame. The main frame has a first guide, a second guide, a groove, and a frame-side connector. The frame-side connector is movably held by the main frame. The unit has a first reference portion and a unit-side connector. The unit is installed in the main frame by a first process in which the first reference portion is guided by the first guide, a second process, in which the first reference portion is guided by the second guide, and a third process, in which the first reference portion is received in the groove and the unit is located in the installation position. The unit-side connector engages the frame-side connector in the first process, and the frame-side connector moves as the unit-side connector moves in the second process and in the third process.

20 Claims, 14 Drawing Sheets

(56) References Cited

FOREIGN PATENT DOCUMENTS

| | | | |
|---|---|---|---|
| JP | 2016-075752 | A | 5/2016 |
| JP | 2017-203944 | A | 11/2017 |
| JP | 2018-205508 | A | 12/2018 |
| JP | 2022-126270 | A | 8/2022 |

* cited by examiner

IMAGE FORMING APPARATUS HAVING GUIDES FOR INSTALLATION AND REMOVAL OF A REMOVAL UNIT

REFERENCE TO RELATED APPLICATIONS

This application claims priority from Japanese Patent Application Nos. 2023-043116, 2023-043117, and 2023-043118 filed on Mar. 17, 2023. The entire contents of the priority applications are incorporated herein by reference.

BACKGROUND ART

An image forming apparatus known in the art includes a fixing device including a heater and configured to be installable into and removable from a main frame of the image forming apparatus. In such an image forming apparatus, a handle of the fixing device is grasped to install or to remove the fixing device into or from the main frame with a cover of the main frame open. Further, an image forming apparatus known in the art includes a fixing device having a connector and a main frame having a connector. The connector of the fixing device and the connector of the main frame are connected as the fixing device is installed into the main frame.

SUMMARY

The fixing device as a unit may possibly be moved in a plurality of different directions before being installed in the main frame. It is desirable that the connector of the main frame and the connector of the unit is easily engaged even if the movement trajectory of the unit being installed into the main frame is complicated.

Thus, the present disclosure provides an image forming apparatus which allows a connector of a main frame and a connector of a unit to be easily engaged even if a movement trajectory of the unit being installed into the main frame is complicated.

In one aspect, an image forming apparatus disclosed herein comprises a main frame and a unit.

The main frame comprises a first guide, a second guide, a groove and a frame-side connector. The first guide extends in a first direction. The second guide extends diagonally from the first guide from one side in a second direction perpendicular to the first direction to another side in the second direction. The groove is recessed from the second guide toward the one side in the second direction. The frame-side connector is movably held by the main frame.

The unit is installable in an installation position in the main frame from outside of the main frame. The unit comprises a first reference portion and a unit-side connector. The first reference portion is received in the groove in a state where the unit is located in the installation position. The unit-side connector is configured to be connected with the frame-side connector in a state where the unit is located in the installation position.

The unit is installed in an installation position in the main frame by a first process, a second process, and a third process.

In the first process, the first reference portion moves while being guided by the first guide from one side in the first direction to another side in the first direction. In the second process following the first process, the first reference portion moves while being guided by the second guide. In the third process following the second process, the first reference portion is received in the groove and the unit is located in the installation position.

The unit-side connector engages the frame-side connector in the first process. The frame-side connector moves as the unit-side connector moves in the second process. The frame-side connector moves as the unit-side connector moves in the third process.

In the image forming apparatus in which the unit is installable into the main frame by the first process, the second process, and the third process, the unit-side connector can engage the frame-side connector in the first process, and then the frame-side connector can move as the unit-side connector moves in the second process and in the third process. Thus, the frame-side connector and the unit-side connector can be easily engaged even if the movement trajectory of the unit being installed into the main frame is complicated.

The frame-side connector may comprise a first connector housing holding a terminal therein and an engagement portion. The unit-side connector may comprise a second connector housing holding a terminal therein and configured to interfit with the first connector housing in a state where the unit is installed in the main frame, and a to-be engaged portion configured to be engaged with the engagement portion. The to-be engaged portion may be engaged with the engagement portion before the second connector housing interfits with the first connector housing when the unit is being installed in the main frame.

Since the engagement portion and the to-be engaged portion are engaged before the second connector housing interfits with the first connector housing, the second connector housing can be appropriately guided to the first connector housing.

The engagement portion may be a guide pin protruding toward the one side in the first direction, with an end located further toward the one side in the first direction relative to the first connector housing. The to-be engaged portion may be a guide hole in which the guide pin is to be inserted.

The frame-side connector may be configured to tilt such that a first surface of the frame-side connector facing the one side in the first direction faces the one side in the second direction. The frame-side connector may be configured such that the first surface of the frame-side connector faces the first direction in the first process and tilts such that the first surface of the frame-side connector faces the one side in the second direction in the second process.

Since the first surface faces the first direction in the first process and tilts such that the first surface faces the one side in the second direction in the second process, the frame-side connector and the unit-side connector are not easily disengaged even if the movement trajectory of the unit is changed in a state in which the frame-side connector and the unit-side connector are engaged.

The first surface of the frame-side connector may face the first direction after the third process is completed and the unit is located in the installation position.

Since the first surface faces the first direction after the third process is completed, the posture of the unit at the start of installation and the posture of the unit after the completion of installation can be made almost the same.

The frame-side connector has a lower end facing the one side in the second direction and an upper end facing the another side in the second direction. The frame-side connector may be configured to tilt such that the upper end thereof moves toward the one side in the first direction.

The unit-side connector may be electrically connected to the frame-side connector in the second process.

The main frame may further comprise a third guide that extends in the first direction, and the unit may further comprise a second reference portion. The unit may move with the second reference portion being guided by the third guide in the first process. The unit may rotate about the second reference portion in the second process.

The second reference portion may be located further toward the one side in the first direction relative to the first reference portion.

The first guide may have a first guide surface facing upward, and the second guide may have a second guide surface facing diagonally upward. The unit may be configured such that the unit moves in the first direction as the first reference portion slides along the first guide surface in the first process, the first reference portion moves diagonally upward as the first reference portion slides along the second guide surface in the second process, and the unit is located in the installation position as the first reference portion is received in the groove and moves downward in the third process.

The unit may be configured as a fixing device comprising a heating member including a heater, and a pressure member configured to nip a sheet in combination with the heating member.

The main frame may comprise a power supply unit configured to supply power to the heater. The frame-side connector and the unit-side connector may be configured to electrically connect the power supply unit and the heater.

The main frame may comprise a controller configured to control the power supply unit. The frame-side connector and the unit-side connector may be configured to electrically connect the controller and the sensor.

In another aspect, an image forming apparatus disclosed herein comprises a main frame and a unit, and the unit may comprise a sensor configured to detect a temperature of the heating member. The main frame comprises a frame-side connector. The unit is installable in an installation position in the main frame from outside of the main frame. The unit comprises a unit-side connector connected to the frame-side connector in a state where the unit is located in the installation position.

The frame-side connector and the unit-side connector are opposed in the first direction and are engaged with each other in a process in which the unit is installed into the main frame.

One of the frame-side connector and the unit-side connector is a movable connector.

Another of the frame-side connector and the unit-side connector is a fixed connector.

One of the main frame and the unit provided with the movable connector comprises a first restriction portion, a second restriction portion, and a spring. The first restriction portion faces upstream in an installation direction of the fixed connector. The first restriction portion is configured to contact the movable connector and to restrict a range of movement of the movable connector. The second restriction portion faces a second direction perpendicular to the first direction. The second restriction portion is configured to contact the movable connector and to restrict a range of movement of the movable connector. The spring is configured to bias the movable connector toward the first restriction portion and toward the second restriction portion.

One of the main frame and the unit provided with the movable connector comprises a first restriction portion facing upstream in the installation direction of the fixed connector and configured to contact the movable connector, a second restriction portion facing the second direction and configured to contact the movable connector, and a spring configured to bias the movable connector toward the first restriction portion and toward the second restriction portion. Thus, the movable connector is biased toward both of the first restriction portion and the second restriction portion before the frame-side connector and the unit-side connector are engaged with each other, and the movable connector is movable in the process in which the frame-side connector and the unit-side connector are engaged with each other. As a result, the frame-side connector and the unit-side connector can be easily engaged when the unit is installed into the main frame even if the movement trajectory of the unit being installed into or removed from the main frame is complicated.

A dimension of the movable connector in the second direction may be greater than a dimension of the movable connector in a third direction perpendicular to the first direction and to the second direction.

The movable connector may be configured to contact the first restriction portion and the second restriction portion before the unit is installed into the main frame, and to be separated from at least one of the first restriction portion and the second restriction portion in the process in which the unit is installed into the main frame.

The one of the main frame and the unit provided with the movable connector may further comprise a third restriction portion spaced apart from the movable connector in the second direction in a state where the movable connector is in contact with the second restriction portion.

Since the main frame comprises the third restriction portion, the movable connector is movable in the second direction between the second restriction portion and the third restriction portion.

The movable connector may be configured to tilt such that a portion of the movable connector distant from the second restriction portion in the second direction moves away from the first restriction portion in the first direction.

Since the movable connector is configured to tilt, the frame-side connector and the unit-side connector can be engaged easily.

The one of the main frame and the unit provided with the movable connector may further comprise a fourth restriction portion that is spaced apart from the portion of the movable connector distant from the second restriction portion in the second direction, to one side in the first direction, in a state where the movable connector is in contact with the first restriction portion.

Since the main frame comprises the fourth restriction portion, the range in which the movable connector tilts can be restricted.

The movable connector may comprise a hook portion to which the spring is hooked which hook portion is located farther from the second restriction portion than from a central portion of the movable connector in the second direction.

Since the spring can bias a portion of the movable connector spaced apart from a fulcrum of the movable connector when the movable connector tilts, the posture of the movable connector becomes stable.

The movable connector may comprise a connector housing configured to hold a terminal and two engagement portions located on both sides of the connector housing and configured to engage the fixed connector.

Each of the engagement portions may be a guide pin configured to guide the movable connector and the fixed connector into engagement with an end of the guide pin protruding from the housing. The fixing connector may comprise guide holes in which the guide pins are to be inserted.

The one of the main frame and the unit may further comprise a fifth restriction portion configured to contact the movable connector from one side in a third direction perpendicular to the first direction and to the second direction and to restrict a range of movement of the movable connector, and a sixth restriction portion configured to contact the movable connector from another side in the third direction and to restrict a range of movement of the movable connector. A distance from the fifth restriction portion to the sixth restriction portion may be greater than a dimension of the movable connector in the third direction.

Since the main frame comprises the fifth restriction portion and the sixth restriction portion, the movable connector can be allowed to move in the third direction while restricting the amount of movement of the movable connector in the third direction.

The movable connector may be provided at the main frame.

By providing the movable connector at the main frame and providing the fixed connector at the unit, the unit may be made more compact.

The unit may be configured as a fixing device comprising a heating member including a heater, and a pressure member configured to nip a sheet in combination with the heating member.

The main frame may comprise a power supply unit configured to supply power to the heater. The frame-side connector and the unit-side connector may be configured to electrically connect the power supply unit and the heater.

The main frame may comprise a controller configured to control the power supply unit. The unit may comprise a sensor configured to detect a temperature of the heating member. The frame-side connector and the unit-side connector may be configured to electrically connect the controller and the sensor.

In yet another aspect, an image forming apparatus disclosed herein comprises a main frame and a unit. The main frame comprises a frame-side connector. The unit is installable in an installation position in the main frame from outside of the main frame. The unit comprises a unit-side connector connected to the frame-side connector in a state where the unit is located in the installation position.

The frame-side connector and the unit-side connector are opposed in a first direction and are engaged with each other in a process in which the unit is installed into the main frame. One of the frame-side connector and the unit-side connector comprises a guide pin that guides the frame-side connector and the unit-side connector into engagement. Another of the frame-side connector and the unit-side connector comprises a guide hole in which the guide pin is inserted in a state where the frame-side connector and the unit-side connector are engaged. The guide hole comprises a cylindrical portion, an inlet, and a conical portion. The cylindrical portion with the guide pin received therein restricts the position of the unit-side connector with respect to the frame-side connector. The inlet is greater than the cylindrical portion. The conical portion connects the inlet and the cylindrical portion.

In a plane perpendicular to an axial direction of the cylindrical portion, a dimension of the inlet in a third direction, perpendicular to the axial direction and to a second direction perpendicular to the first direction, is greater than a dimension of the inlet in the second direction.

Since the dimension of the inlet in the third direction is greater than the dimension of the inlet in the second direction, the conical portion can be restrained from becoming larger in the second direction, and the unit-side connector can be more easily engaged with the frame-side connector even if the unit-side connector is slightly misaligned in the third direction when the unit is being installed into the main frame.

One of the frame-side connector and the unit-side connector may be a movable connector movable in the second direction and in the third direction. One of the main frame and the unit provided with the movable connector may comprise a restriction portion configured to contact the movable connector from one side in the second direction and to restrict a range of movement of the movable connector, and a spring configured to bias the movable connector toward the restriction portion.

Since the movable connector comprises the restriction portion and the spring, the movable connector is biased toward the restriction portion before the frame-side connector and the unit-side connector are engaged, and the movable connector is movable in a process in which the frame-side connector and the unit-side connector are engaged with each other. As a result, the frame-side connector and the unit-side connector are more easily engaged when the unit is installed into the main frame even if the movement trajectory of the unit being installed into or removed from the main frame is complicated.

The frame-side connector may be movably held by the main frame.

By configuring the frame-side connector to be movable, and the unit-side connector not to be movable, upsizing of the unit can be restrained.

The frame-side connector may be configured to tilt with the guide pin received in the cylindrical portion such that a surface of the frame-side connector opposed to the unit-side connector faces one side in the second direction in the process in which the unit is installed into the main frame.

Since the frame-side connector is configured to tilt, the frame-side connector and the unit-side connector can move as one unit even if the movement trajectory of the unit being installed into the main frame is complicated.

The image forming apparatus may be configured such dimensions of the frame-side connector and the unit-side connector in the second direction are greater than respective dimensions of the frame-side connector and the unit-side connector in the third direction.

Two guide pins may be provided, and a connector housing holding a terminal may be provided between the two guide pins. Two guide holes may be provided, and a connector housing holding a terminal may be provided between the two guide holes.

The frame-side connector and the unit-side connector can be stably engaged by the two guide pins and the two guide holes.

A cross section of a cylindrical portion of one of the guide holes may be a perfect circle, and a cross section of a cylindrical portion of another of the guide holes may be a long hole elongate in a direction in which two guide pins are aligned.

Since the cross section of the cylindrical portion of the another guide hole is a long hole, more space is provided to allow the two guide pins to be engaged more easily.

Ends of the guide pins may protrude further than the connector housing.

Since the ends of the guide pins protrude further than the connector housing, the connector housing can be restrained from contacting another component.

The guide pins may be provided at the frame-side connector.

The unit may be configured as a fixing device comprising a heating member including a heater, and a pressure member configured to nip a sheet in combination with the heating member.

The main frame may comprise a power supply unit configured to supply power to the heater. The frame-side connector and the unit-side connector may be configured to electrically connect the power supply unit and the heater.

The main frame may comprise a controller configured to control the power supply unit. The unit may comprise a sensor configured to detect a temperature of the heating member. The frame-side connector and the unit-side connector may be configured to electrically connect the controller and the sensor.

BRIEF DESCRIPTION OF DRAWINGS

The above aspects, other advantages and further features will become more apparent by describing in detail illustrative, non-limiting embodiments thereof with reference to the accompanying drawings, in which.

DESCRIPTION

Figure 1:
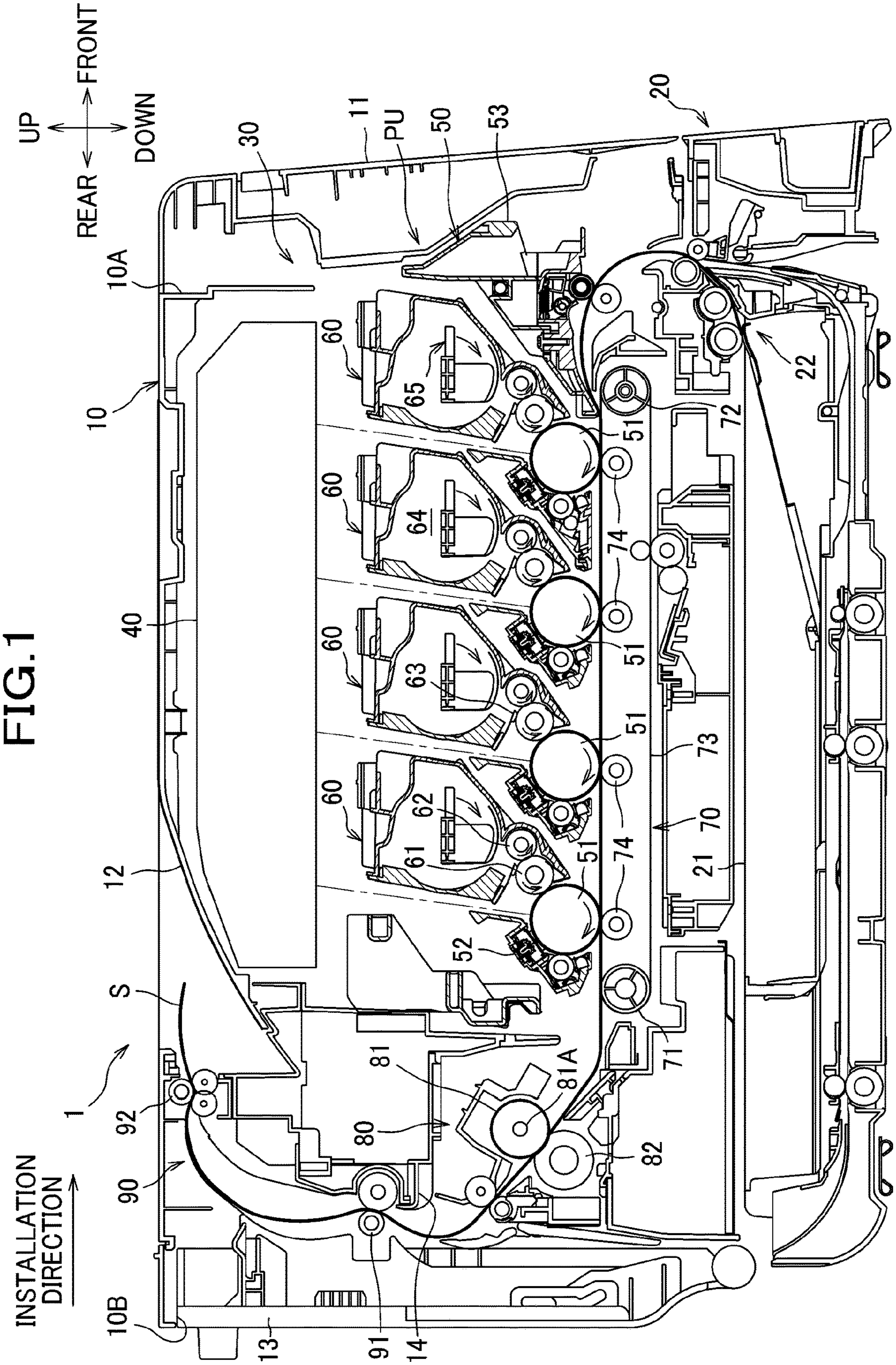
FIG. 1 is a cross-sectional view of an image forming apparatus.

An embodiment of the present disclosure will be described in detail referring to the drawings where appropriate.

As shown in FIG. 1, an image forming apparatus 1 comprises a main frame 10, a sheet feeder unit 20, a process section 30, a fixing device 80 as an example of a unit, and a sheet ejection unit 90.

The main frame 10 comprises a front cover 11, an output tray 12, a rear cover 13, and an inner frame 14. The main frame 10 has an opening 10A on a front side thereof and an opening 10B on a rear side thereof. The front cover 11 opens and closes the opening 10A. The rear cover 13 opens and closes the opening 10B.

The sheet feeder unit 20 comprises a sheet tray 21 and a feeding mechanism 22. The sheet tray 21 contains sheets S of paper or the like. The feeding mechanism 22 feeds the sheets S in the sheet tray 21 to the process section 30.

The process section 30 forms a toner image on each sheet S. The process section 30 comprises an exposure device 40, a process unit PU, and a transfer unit 70.

The exposure device 40 is located above the process unit PU. The exposure device 40 emits light beams to expose surfaces of photosensitive drums 51.

The process unit PU is located between the sheet tray 21 and the exposure device 40. The process unit PU is installable into and removable from the main frame 10 through the opening 10A of the main frame 10, which is opened by opening the front cover 11. The process unit PU comprises a drum cartridge 50 and a plurality of toner cartridges 60.

The drum cartridge 50 comprises a plurality of photosensitive drums 51, a plurality of chargers 52 corresponding to each of the photosensitive drums 51, and a drum frame 53.

The drum frame 53 supports the photosensitive drums 51 and the chargers 52. The drum frame 53 is movably supported by the main frame 10. The toner cartridges 60 are installable onto and removable from the drum frame 53.

The plurality of toner cartridges 60 each contains toner of a different color. Each toner cartridge 60 comprises a development roller 61, a supply roller 62, a doctor blade 63, a toner containing unit 64 that contains toner, and an agitator 65.

The agitator 65 agitates toner in the toner containing unit 64. The agitator 65 supplies toner to the supply roller 62. The supply roller 62 supplies toner to the development roller 61. The doctor blade 63 adjusts the thickness of toner on the development roller 61 to a uniform thickness.

The transfer unit 70 is located between the sheet tray 21 and the process unit PU. The transfer unit 70 comprises a drive roller 71, a follower roller 72, a conveyor belt 73, and a plurality of transfer rollers 74. The conveyor belt 73 is an endless belt for conveying the sheet S. The drive roller 71 and the follower roller 72 cause the conveyor belt 73 to rotate. The transfer rollers 74 face an inner surface of the conveyor belt 73. The conveyor belt 73 is sandwiched between the transfer rollers 74 and the photosensitive drums 51.

The fixing device 80 comprises a heating roller 81 as an example of a heating member, and a pressure roller 82 as an example of a pressure member. The heating roller 81 includes a heater 81A. The heating roller 81 receives a driving force from a drive source (not shown) and rotates.

The pressure roller 82 nips the sheet S in combination with the heating roller 81. The pressure roller 82 is driven by the heating roller 81 and rotates.

The chargers 52 charge the corresponding surfaces of the photosensitive drums 51. The exposure device 40 exposes the surfaces of the photosensitive drums 51. Electrostatic latent images are thereby formed on the photosensitive drums 51. The development rollers 61 supply toner to the corresponding photosensitive drums 51. Toner images are thereby formed on the photosensitive drums 51.

The sheet feeder unit 20 feeds the sheet S through between the photosensitive drums 51 and the transfer rollers 74. The toner images on the photosensitive drums 51 are transferred onto the sheet S. The sheet S on which the toner images are transferred is conveyed through between the heating roller 81 and the pressure roller 82. The fixing device 80 thereby thermally fixes the toner images onto the sheet S.

The sheet ejection unit 90 comprises a conveyor roller 91 and an ejection roller 92. The conveyor roller 91 conveys the sheet S to the ejection roller 92. The ejection roller 92 ejects the sheet S onto the output tray 12.

Figure 2:
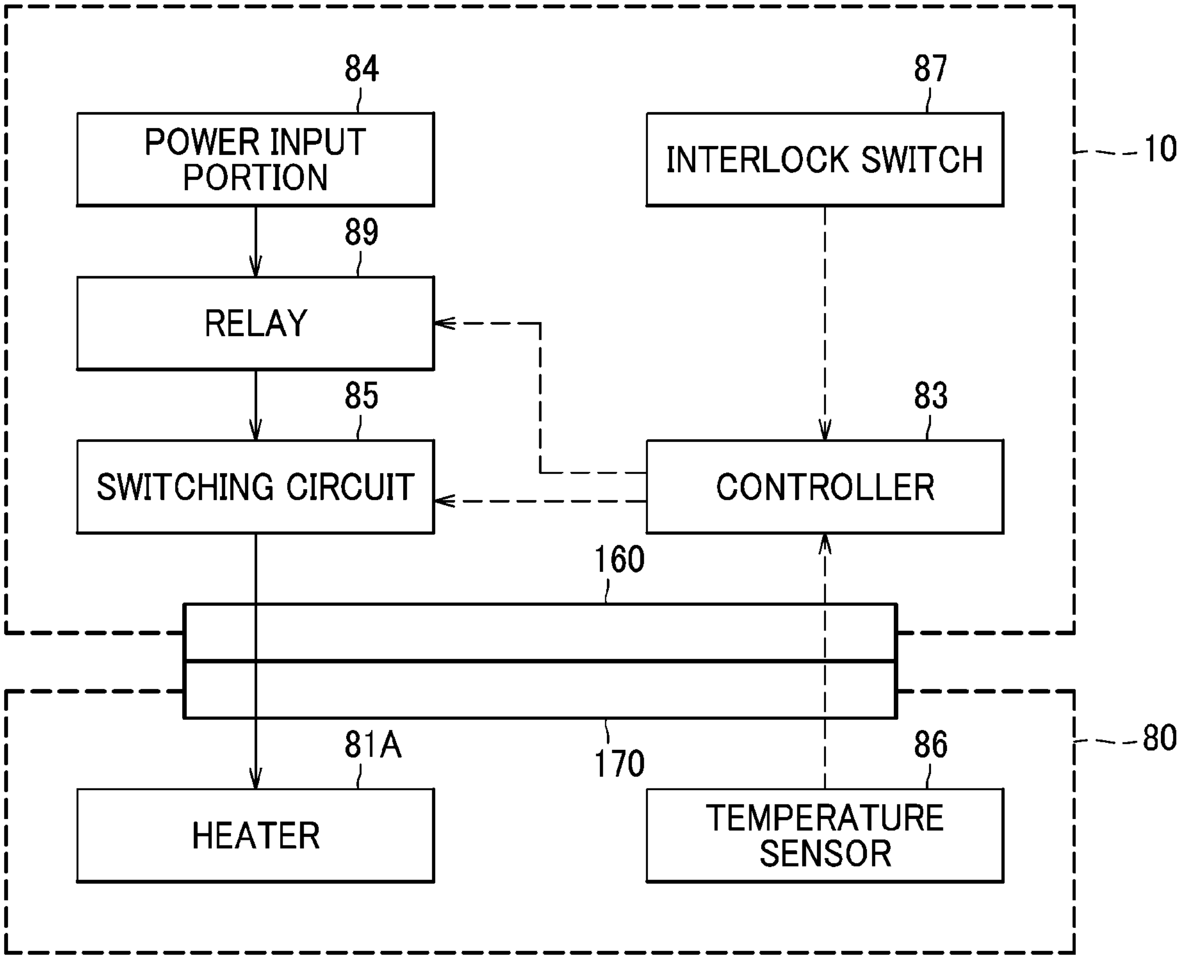
FIG. 2 is a block diagram showing electrical connections between components of the image forming apparatus.

As shown in FIG. 2, the image forming apparatus 1 further comprises a controller 83, a power input portion 84, a switching circuit 85, a temperature sensor 86, an interlock switch 87, a relay 89, a frame-side connector 160, and a unit-side connector 170. The controller 83, the power input portion 84, the switching circuit 85, the interlock switch 87, and the frame-side connector 160 are provided at the main frame 10. The temperature sensor 86 and the unit-side connector 170 are provided at the fixing device 80. It is to be understood that the power input portion 84, the switching circuit 85, and the relay 89 are an example of a power supply unit capable of supplying power to the heater 81A.

The controller 83 includes a central processing unit (CPU), a random-access memory (RAM), a read-only memory (ROM), an input/output circuit, etc., and performs various arithmetic processing based on programs and/or data stored in the ROM or other components to execute control.

The power input portion 84 is connected to an AC power source and supplies power to the switching circuit 85.

The relay 89 is provided between the power input portion 84 and the switching circuit 85. The relay 89 is switchable between a connected state in which power is supplied from the power input portion 84 to the switching circuit 85, and a shut-off state in which power is not supplied from the power input portion 84 to the switching circuit 85. The relay 89 comprises a moving contact that switches the relay 89 to the connected state and to the shut-off state, and an electromagnet that operates the moving contact. The electromagnet operates in response to a command from the controller 83 to switch the moving contact.

The switching circuit 85 comprises a semiconductor device such as triac. The switching circuit 85 is a circuit capable of supplying or shutting off power to the heater 81A, in response to a command from the controller 83.

The temperature sensor 86 detects the temperature of the heating roller 81. Information of the measured temperature of the heating roller 81 is transmitted to the controller 83. The controller 83 transmits a command to the switching circuit 85 based on the information from the temperature sensor 86.

The interlock switch 87 has an on-state in which the interlock switch 87 allows power to be supplied to the heater 81A, and an off-state in which the interlock switch 87 shuts off power to the heater 81A. In the present embodiment, the controller 83 determines that the interlock switch 87 is in the on-state when the interlock switch 87 assumes an electrically-continuous state and switches the relay 89 to the connected state. The controller 83 determines that the interlock switch 87 is in the off-state when the interlock switch 87 assumes an electrically-noncontinuous state and switches the relay 89 to the shut-off state. When the relay 89 is in the shut-off state, power to the switching circuit 85 is shut off, shutting off power to the heater 81A.

The frame-side connector 160 is held by the main frame 10. The unit-side connector 170 is held by a fixing housing 100 of the fixing device 80. The frame-side connector 160 is connected to the unit-side connector 170 when the fixing device 80 is installed in an installation position in the main frame 10. When the frame-side connector 160 is connected to the unit-side connector 170, the power supply unit and the heater 81A are electrically connected, allowing power to be supplied from the switching circuit 85 to the heater 81A. Further, when the frame-side connector 160 is connected to the unit-side connector 170, the controller 83 and the temperature sensor 86 are electrically connected, allowing the temperature information detected by the temperature sensor 86 to be transmitted to the controller 83.

Figure 3:
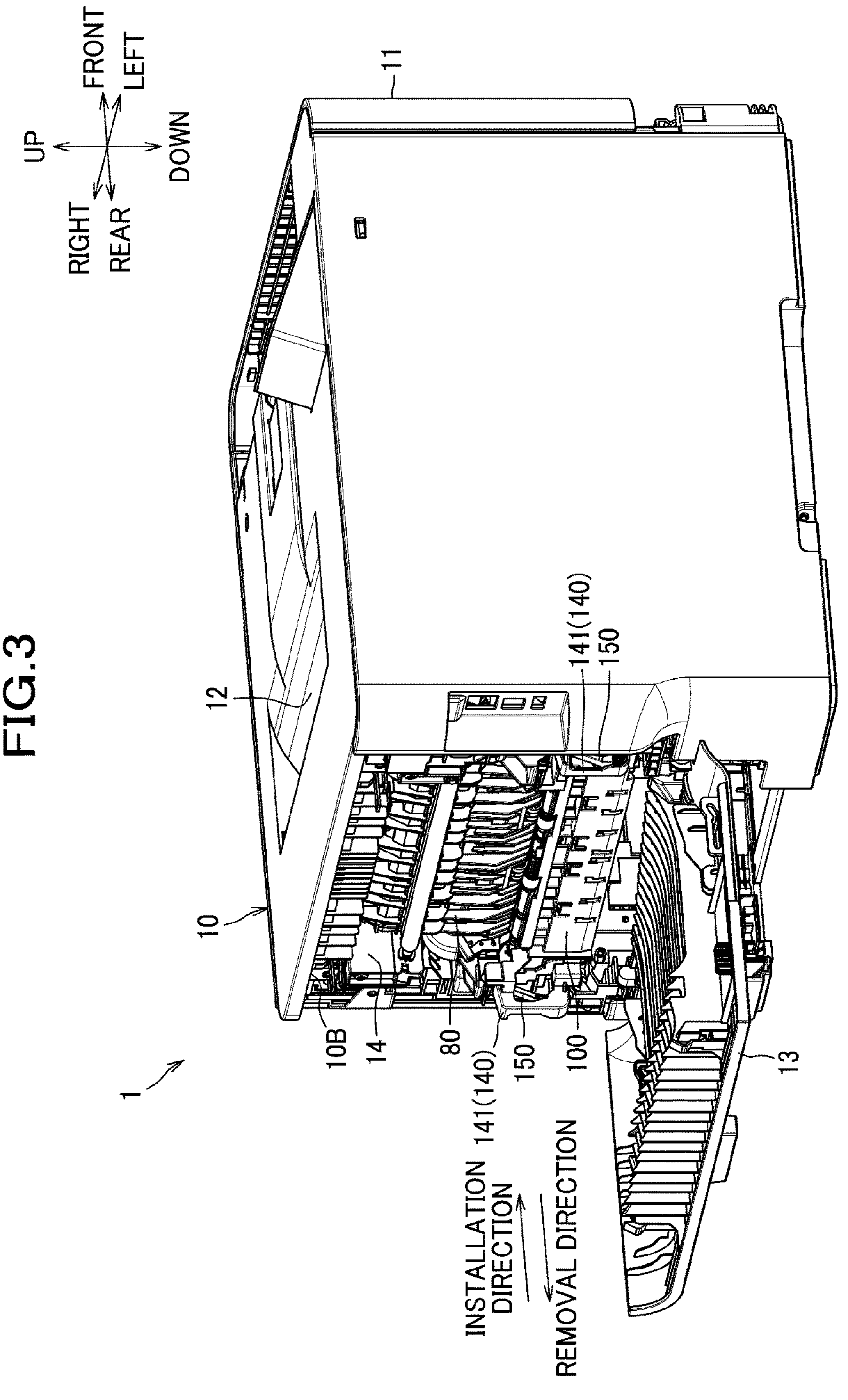
FIG. 3 is a perspective view of the image forming apparatus with a rear cover open.
Figure 4:
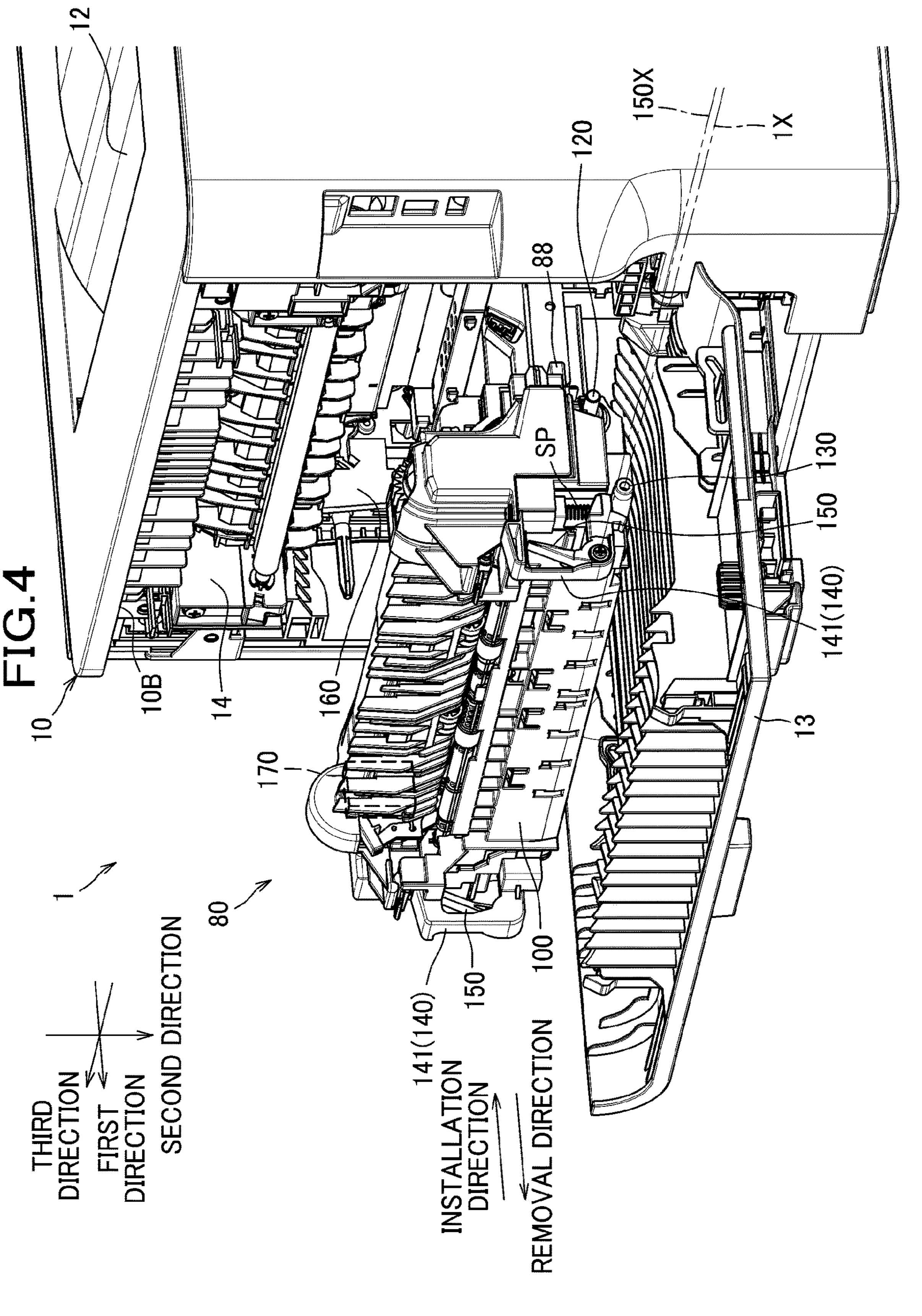
FIG. 4 is a perspective view of the image forming apparatus showing the fixing device pulled out from the state shown in FIG. 3.

As shown in FIGS. 3 and 4, the fixing device 80 is installable into and removable from the main frame 10. Specifically, the fixing device 80 is installable into and removable from the main frame 10 through the opening 10B of the main frame 10, which is opened by opening the rear cover 13. That is, the main frame 10 supports the fixing device 80 so that the fixing device 80 is installable into and removable from the main frame 10.

The first direction is parallel to an installation direction in which the fixing device 80 is installed into the main frame 10 from the outside of the main frame 10. In the present embodiment, the first direction is parallel to a front-rear direction of the image forming apparatus 1, and one side in the first direction is a direction toward the rear of the image forming apparatus 1. In the following description, the upstream side in the installation direction of the fixing device 80 is referred to as the one side in the first direction, and the downstream side in the installation direction of the fixing device 80 is referred to as the other side in the first direction. The arrows that indicate the directions in the drawings point to one side of the corresponding directions.

The second direction is a direction perpendicular to the first direction. In the present embodiment, the second direction is parallel to an up-down direction of the image forming apparatus 1. In the following description, the downward direction is referred to as one side in the second direction, and the upward direction is referred to as the other side in the second direction.

The third direction is a direction perpendicular to the first direction and to the second direction. In the present embodiment, one side in the third direction corresponds to the right side of the image forming apparatus 1, and the other side in the third direction corresponds to the left side of the image forming apparatus 1.

The fixing device 80 is removed from the installation position shown in FIG. 3 toward the one side in the first direction. In the following description, the direction in which the fixing device 80 is removed is also referred to as a removal direction. As shown in FIG. 4, the fixing device 80 is installed from the one side in the first direction toward the other side in the first direction.

As shown in FIG. 4, the fixing device 80 comprises a fixing housing 100, a first reference portion 120, a second reference portion 130, a fixed handle 140, a lever 150, a spring SP, and a switch contact portion 88. The fixing housing 100 has a first side facing the one side in the third direction and a second side facing the other side in the third direction. The fixing housing 100 has a lower end (lower end portion) facing the one side in the second direction and an upper end (upper end portion) facing the other side in the second direction. Further, the fixing housing 100 has a first end facing the one side in the first direction and a second end facing the other side in the first direction. In FIG. 4, only the first reference portion 120, the second reference portion 130, and the spring SP disposed at the other side in the third direction are shown.

The first reference portion 120 is a shaft having a cylindrical outer surface. The first reference portion 120 is located at the first side and the second side of the fixing housing 100. The two first reference portions 120 respectively protrude toward the one side and the other side in the third direction. The first reference portions 120 are located at the lower end portion of the fixing housing 100. The first reference portions 120 are located at the second end of the fixing housing 100. In other words, the first reference portions 120 are located at a downstream end of the fixing housing 100 in the installation direction.

The first reference portions 120 engage positioning parts, which will be described later, to locate the fixing device 80 in place in the installation position. Specifically, each of the first reference portions 120 is located in the corresponding first recess G3 as an example of a groove (see FIG. 5) when the fixing device 80 is located in the installation position to locate the fixing device 80 in place. Each of the first reference portions 120 enters the corresponding first recess G3 and is thereby located in place with respect to the main frame 10 in the second and first directions.

The second reference portion 130 is a shaft having a cylindrical outer surface. The second reference portion 130 is located at the first side and the second side of the fixing housing 100. The two second reference portions 130 respectively protrude toward the one side and the other side in the third direction. The second reference portions 130 are located at the lower end of the fixing housing 100. The second reference portions 130 are located upstream of the first reference portions 120 in the installation direction. The second reference portions 130 are located further toward the one side in the second direction relative to the first reference portions 120. The second reference portions 130 are located upstream of a central portion of the fixing housing 100 in the installation direction. Accordingly, the weight of a part of the fixing device 80 located downstream of the second reference portion 130 in the installation direction is greater than the weight of a part of the fixing device 80 located upstream of the second reference portion 130 in the installation direction. In the following description, an axis extending in the third direction through centers of the second reference portions 130 is referred to as a first axis 1X.

Figure 5A:
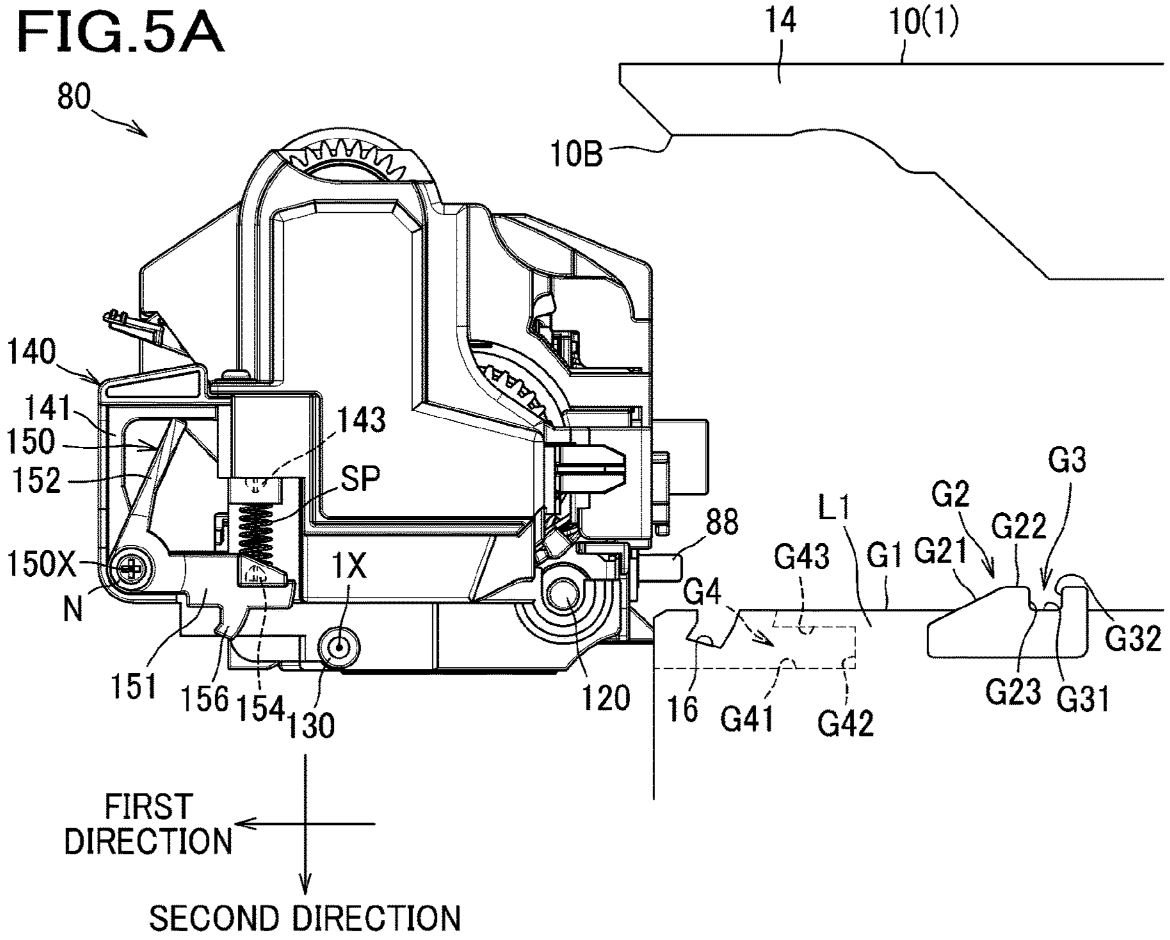
FIG. 5A is an illustration showing a state before the fixing device is installed in the main frame.

The fixed handle 140 is a handle that a user grasps when installing or removing the fixing device 80. The fixed handle 140 is provided at the first side and at the second side of the fixing housing 100. The two fixed handles 140 are located at the first end of the fixing housing 100. In other words, the fixed handles 140 are located at an upstream end of the fixing housing 100 in the installation direction. As shown in FIG. 5A, the fixed handles 140 each comprise a grip 141 and a first protrusion 143.

The grip 141 is a part of the fixed handle 140 the user can grasp when removing the fixing device 80. As shown in FIG. 3, the grip 141 is exposed to the outside of the main frame 10 when the rear cover 13 is opened. The first protrusion 143 protrudes downward. The first protrusion 143 holds one end of the spring SP.

The lever 150 is L-shaped. The lever 150 is attached to the fixed handle 140 by a screw N. The lever 150 is rotatable about a lever axis 150X between a first position shown in FIG. 7B and a second position shown in FIG. 7A. In this embodiment, an axial direction of the lever axis 150 X is a widthwise direction of the sheet S. The spring SP is a compression spring located between the fixed handle 140 and the lever 150. The spring SP constantly biases the lever 150 from the second position toward the first position.

The lever 150 comprises a body 151, a holding portion 152, a second protrusion 154, and an engagement portion 156.

The body 151 extends along the first direction. The body 151 has a first end (first end portion) facing the one side in the first direction and a second end (second end portion) facing the other side in the first direction. The holding portion 152 extends along the second direction. That is, the holding portion 152 extends in a direction different from a direction in which the body 151 extends, and forms the shape of the letter L with the body 151. The holding portion 152 is graspable when removing the fixing device 80 from the main frame 10. When the user grasps both of the grip 141 and the holding portion 152 and moves the holding portion 152 toward the grip 141, the lever 150 moves from the first position shown in FIG. 7B to the second position shown in FIG. 7A. That is, the holding portion 152 is located closer to the grip 141 when the lever 150 is in the second position than when the lever 150 is in the first position.

As shown in FIG. 5A, the second protrusion 154 protrudes upward. The second protrusion 154 holds the other end of the spring SP.

The engagement portion 156 is a protrusion that extends from the second end portion of the body 151 toward the one side in the second direction. That is, the engagement portion 156 is a protrusion protruding in the direction of rotation of the lever 150. In this embodiment, the engagement portion 156 is shaped as a hook which end is bent in the removal direction.

The main frame 10 has an engagement hole 16. The engagement hole 16 is located at an inner wall surface of the main frame 10. The engagement hole 16 is a hole in which the engagement portion 156 is received when the fixing device 80 is installed in the main frame 10 with the lever 150 located in the first position. The engagement hole 16 restricts the fixing device 80 from being disengaged from the main frame 10 when the engagement portion 156 is received in the engagement hole 16.

Figure 7A:
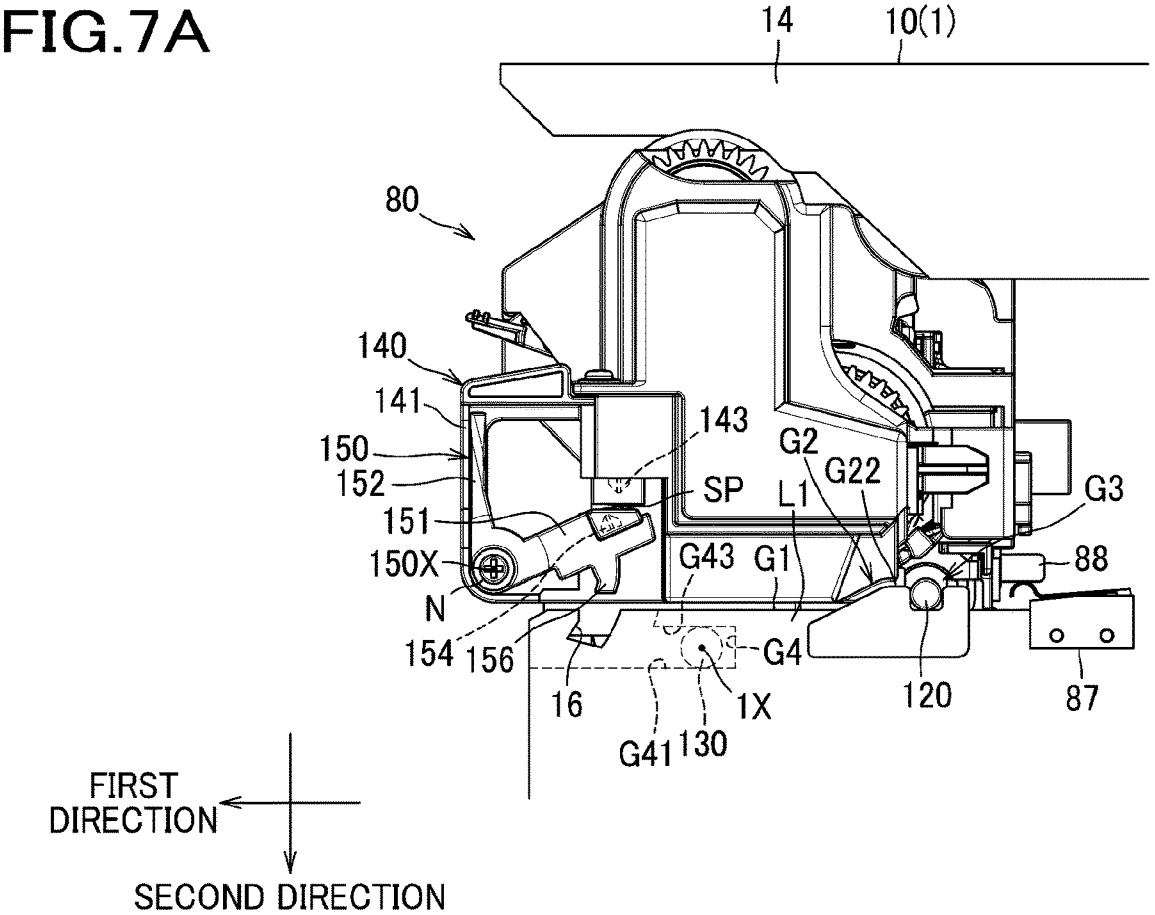
FIG. 7A is an illustration showing a state in which a lever is located in a first position and the fixing device is located in an installation position.
Figure 7B:
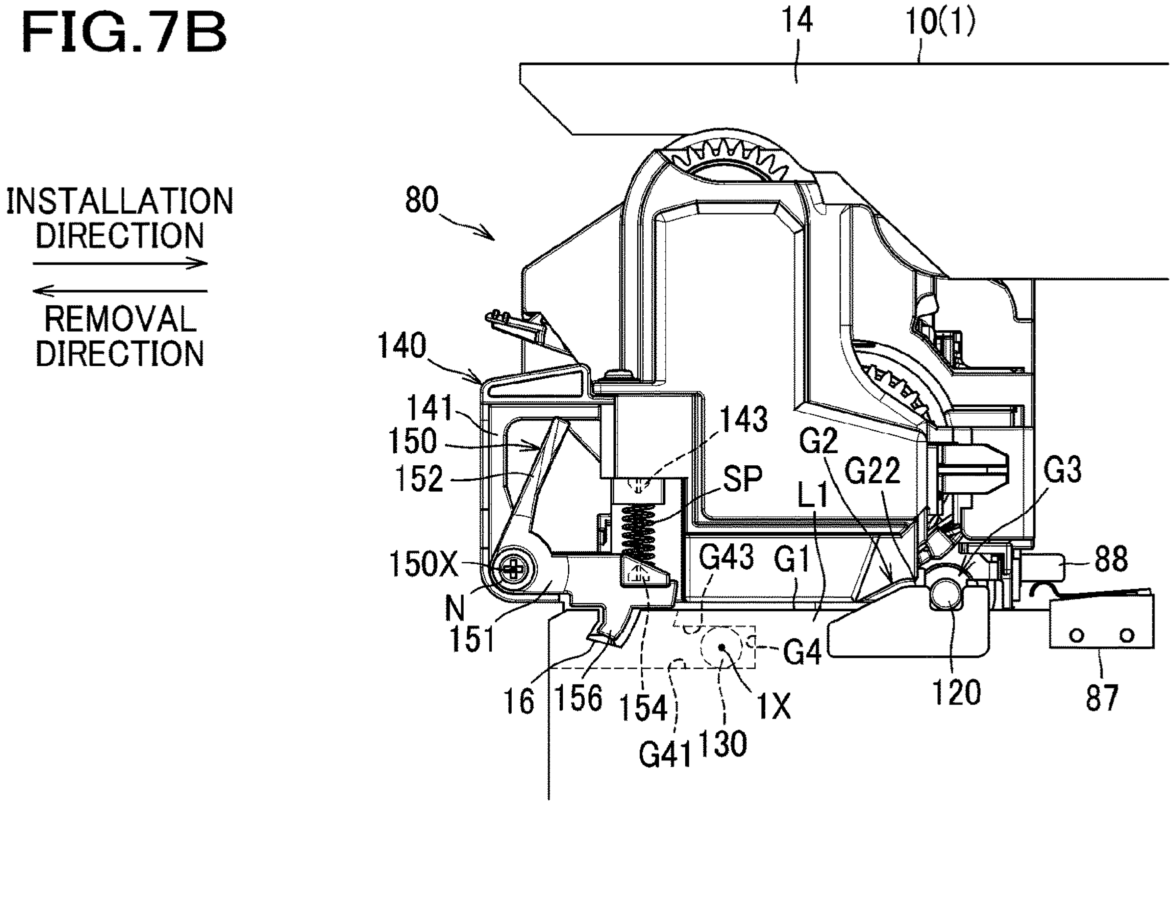
FIG. 7B is an illustration showing a state in which the lever is located in a second position and the fixing device is located in the installation position.

As shown in FIG. 7B, when the lever 150 is located in the first position, the engagement portion 156 is received in the engagement hole 16. When the engagement portion 156 is received in the engagement hole 16, the engagement portion 156 is engaged with the main frame 10.

When the lever 150 is located in the first position, the engagement portion 156 is engaged with the main frame 10 and restricts the fixing device 80 from being disengaged from the main frame 10. Specifically, the engagement portion 156 restricts the fixing device 80 from sliding in the removal direction when the fixing device 80 is located in the installation position.

As shown in FIG. 7A, when the lever 150 is located in the second position, the engagement portion 156 is not engaged with the main frame 10 and does not restrict the fixing device 80 from being disengaged from the main frame 10.

The switch contact portion 88 is located at the second end of the fixing housing 100 at the lower end thereof. The switch contact portion 88 is a protrusion protruding toward the other side in the first direction from the second end of the fixing housing 100. In other words, the switch contact portion 88 is a protrusion protruding downstream from the fixing housing 100 in the installation direction. The first reference portions 120 are located between the switch contact portion 88 and the first axis 1X in the installation direction.

As shown in FIG. 7B, if the fixing device 80 is located in the installation position, the switch contact portion 88 is allowed to contact an arm of the interlock switch 87. When the switch contact portion 88 contacts the arm of the interlock switch 87, the interlock switch 87 switches to an on-state in which power can be supplied to the heater 81A, as described above.

Figure 5B:
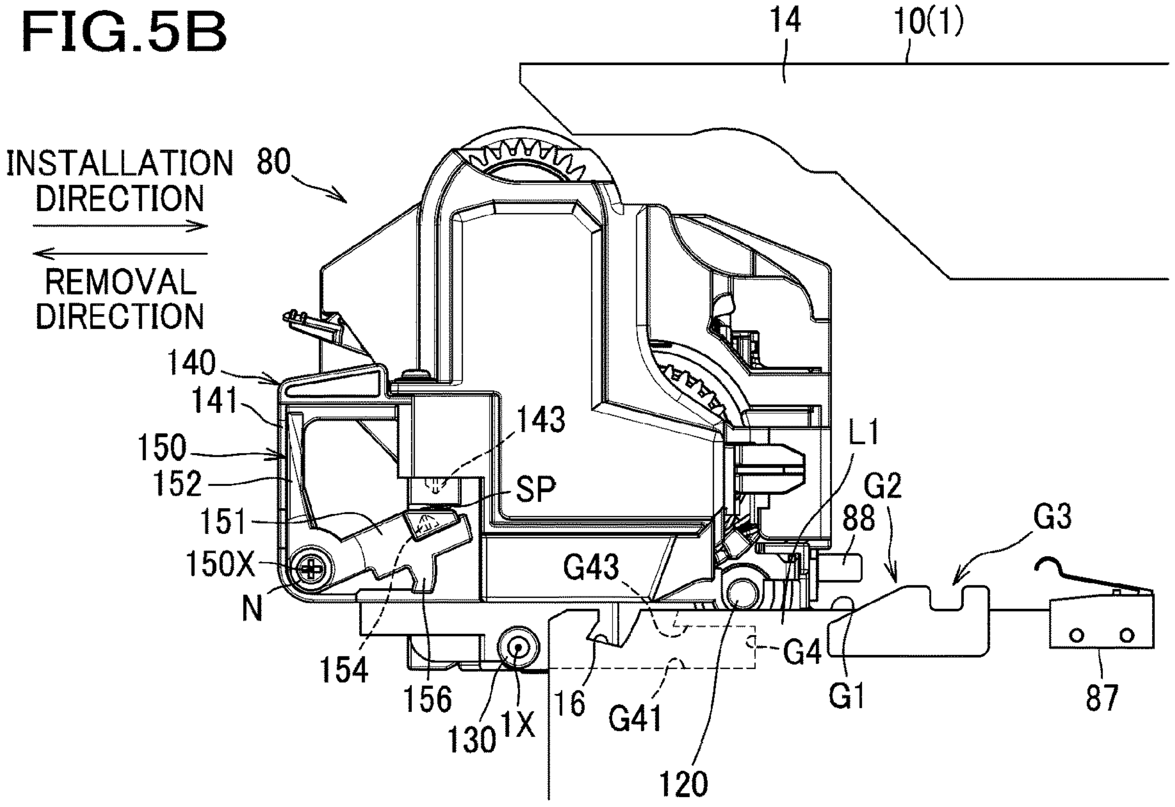
FIG. 5B is an illustration showing a process of installing the fixing device into the main frame with the first reference portion contacting a guide surface.

As shown in FIG. 5B, if the fixing device 80 is not located in the installation position, the switch contact portion 88 does not contact the arm of the interlock switch 87. When the switch contact portion 88 does not contact the arm of the interlock switch 87, the interlock switch 87 switches to an off-state in which power cannot be supplied to the heater 81A, as described above.

As shown in FIG. 5A, the main frame 10 comprises a first guide L1 that has a first guide surface G1, a protrusion G2 as an example of a second guide, a first recess G3 as an example of a groove, and a second recess G4 as an example of a third guide. The first guide L1, the protrusion G2, the first recess G3 and the second recess G4 are provided at a first side of the main frame 100 facing the one side in the third direction and a second side of the main frame 100 facing the other side in the third direction. The first guide L1, the protrusion G2, the first recess G3 and the second recess G4 provided at the second side of the main frame 100 will be described.

The first guide L1 is a rail extending in the first direction. The first guide surface G1 is an upper surface of the first guide L1. The first guide surface G1 is a surface for guiding the corresponding first reference portion 120 of the fixing device 80. The first guide surface G1 is perpendicular to the second direction. The first guide surface G1 contacts the first reference portion 120 from below in the process of installing or removing the fixing device 80.

The protrusion G2 protrudes upward from the first guide surface G1. The protrusion G2 has a first end portion at the one side in the first direction and a second end portion at the other side in the first direction. The protrusion G2 has a second guide surface G21, an upper end surface G22, and a reference surface G23.

The second guide surface G21 extends from the first guide surface G1 and is inclined with respect to the first direction. The second guide surface G21 is located at the first end portion of the protrusion G2. That is, the second guide surface G21 is located at an upstream end portion of the protrusion G2 in the installation direction of the fixing device 80. Specifically, the second guide surface G21 is inclined and faces diagonally upward such that the closer to the downstream side in the installation direction, the higher the second guide surface G21. In other words, the second guide surface G21 is inclined such that the closer to the downstream side in the installation direction, the further apart the second guide surface G21 is from the first guide surface G1.

The upper end surface G22 extends downstream from a downstream end of the second guide surface G21 in the installation direction. The reference surface G23 extends downward from a downstream end of the upper end surface G22 in the installation direction. The reference surface G23 is perpendicular to the first direction. The reference surface G23 is located downstream of the protrusion G2 in the installation direction. The reference surface G23 is in contact with the first reference portion 120 when the fixing device 80 is installed in the main frame 10.

The first recess G3 is a groove that is recessed toward the one side in the second direction from the upper end surface G22 of the protrusion G2. In a state where the fixing device 80 is installed in the main frame 10, the corresponding first reference portion 120 is located in the first recess G3. The first recess G3 has the reference surface G23 described above, a second reference surface G31, and a stopper surface G32.

The second reference surface G31 intersects the reference surface G23. Specifically, the second reference surface G31 is perpendicular to the reference surface G23. The second reference surface G31 extends downstream in the installation direction from a lower end of the reference surface G23. The second reference surface G31 is perpendicular to the second direction. The second reference surface G31 is in contact with the first reference portion 120 when the fixing device 80 is installed in the main frame 10.

The stopper surface G32 extends upward from a downstream end of the second reference surface G31 in the installation direction. The stopper surface G32 contacts the first reference portion 120 at the time of installation of the fixing device 80 and restrains the first reference portion 120 from moving downstream in the installation direction.

The second recess G4 extends in the first direction. The second recess G4 is a recess in which the corresponding second reference portion 130 is located when the fixing device 80 is installed in the main frame 10. The second recess G4 opens upstream in the installation direction. The second recess G4 has a restriction surface G41, a bottom surface G42, and a second restriction surface G43.

The restriction surface G41 is a surface for stopping the corresponding second reference portion 130 from rotating about the first reference portion 120. The restriction surface G41 is perpendicular to the second direction. The restriction surface G41 is in contact with the second reference portion 130 from below when the fixing device 80 is installed in the main frame. The restriction surface G41 extends upstream relative to the second restriction surface G43 in the installation direction.

The bottom surface G42 extends upward from a downstream end of the restriction surface G41 in the installation direction. The second restriction surface G43 extends upstream in the installation direction from an upper end of the bottom surface G42. The second restriction surface G43 contacts the second reference portion 130 to restrain the second reference portion 130 from moving upward.

Figure 8:
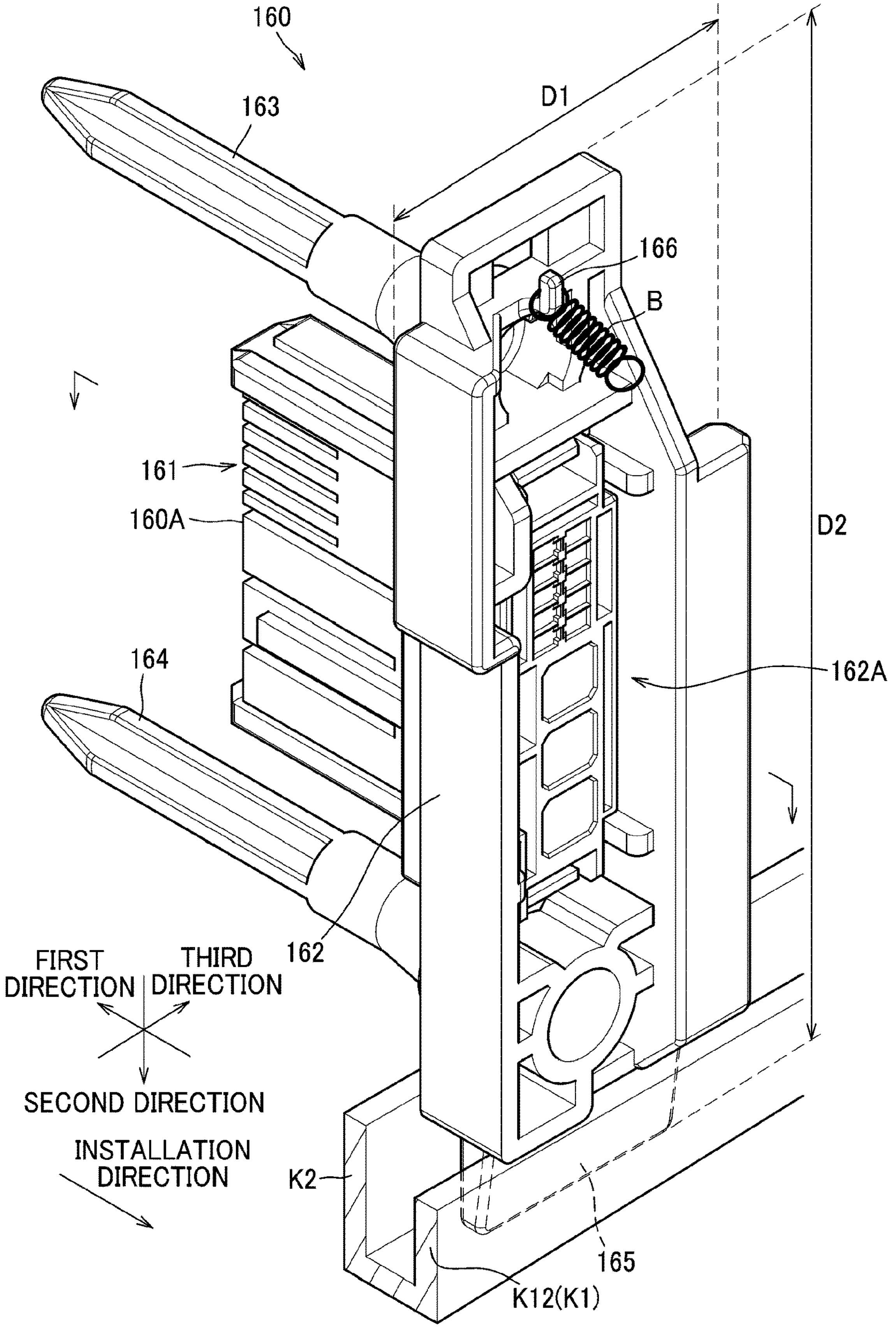
FIG. 8 is a perspective view of a frame-side connector.

As shown in FIG. 8, the dimension D2 of the frame-side connector 160 in the second direction is greater than the dimension D1 of the frame-side connector 160 in the third direction (D1<D2). The frame-side connector 160 has a lower end (lower end portion) facing the one side in the second direction and an upper end (upper end portion) facing the other side in the second direction. The frame-side connector 160 comprises a first connector housing 161, a base 162, a first guide pin 163, a second guide pin 164, a projection 165, a hook portion 166, and a first surface 160A. The first guide pin 163 and the second guide pin 164 are examples of an engagement portion for engagement of a movable connector and a fixed connector. In the present embodiment, among the frame-side connector 160 and the unit-side connector 170, only the frame-side connector 160 is the movable connector movable relative to the main frame 10.

The first connector housing 161 is a part of the frame-side connector 160 that holds terminals and interfits with a second connector housing 171 of the unit-side connector 170, which will be described later. Specifically, the first connector housing 161 is a plug housing, and the second connector housing 171 is a receptacle housing. The first connector housing 161 is located between the first guide pin 163 and the second guide pin 164 in the second direction. The first surface 160A is a surface of the first connector housing 161 facing an upstream side in the installation direction of the fixing device 80.

The base 162 extends in the second direction. The base 162 has a lower end (lower end portion) facing the one side in the second direction and an upper end (upper end portion) facing the other side in the second direction. The base 162 includes a retaining portion 162A located at a central portion thereof in the second direction. The retaining portion 162A holds the first connector housing 161. A downstream end of the first connector housing 161 in the installation direction fits in the retaining portion 162A.

The first guide pin 163 protrudes upstream in the installation direction from the upper end portion of the base 162. The first guide pin 163 has an elongated cylindrical shape with a tapered end. The end of the first guide pin 163 is located upstream of the first connector housing 161 in the installation direction.

The second guide pin 164 protrudes upstream in the installation direction from the lower end portion of the base 162. The second guide pin 164 has an elongated cylindrical shape with a tapered end. The end of the second guide pin 164 is located upstream of the first connector housing 161 in the installation direction.

The projection 165 projects toward the one side in the second direction from the lower end of the base 162. The projection 165 is shaped as a plate extending in a direction perpendicular to the first direction.

The hook portion 166 is located at the upper end portion of the base 162. The hook portion 166 is shaped as a hook extending downstream in the installation direction and then toward the other side in the second direction.

As shown in FIGS. 9A, 9B and FIGS. 10A, 10B, 10C, the frame-side connector 160 is movably held by the main frame 10. Specifically, the frame-side connector 160 is movable between an initial position shown in FIG. 9A and a tilted position shown in FIG. 9B. The frame-side connector 160 is also movable among the positions shown in FIGS. 10A, 10B, 10C. There is no particular initial position of the frame-side connector 160 in the third direction, and the frame-side connector 160 is movable within the range shown in FIGS. 10A, 10B, 10C.

As shown in FIGS. 9A, 9B and FIGS. 10A, 10B, 10C, the main frame 10 includes a first restriction portion K1, a second restriction portion K2, a third restriction portion K3, a fourth restriction portion K4, a fifth restriction portion K5, a sixth restriction portion K6, and a spring B.

Figure 9A:
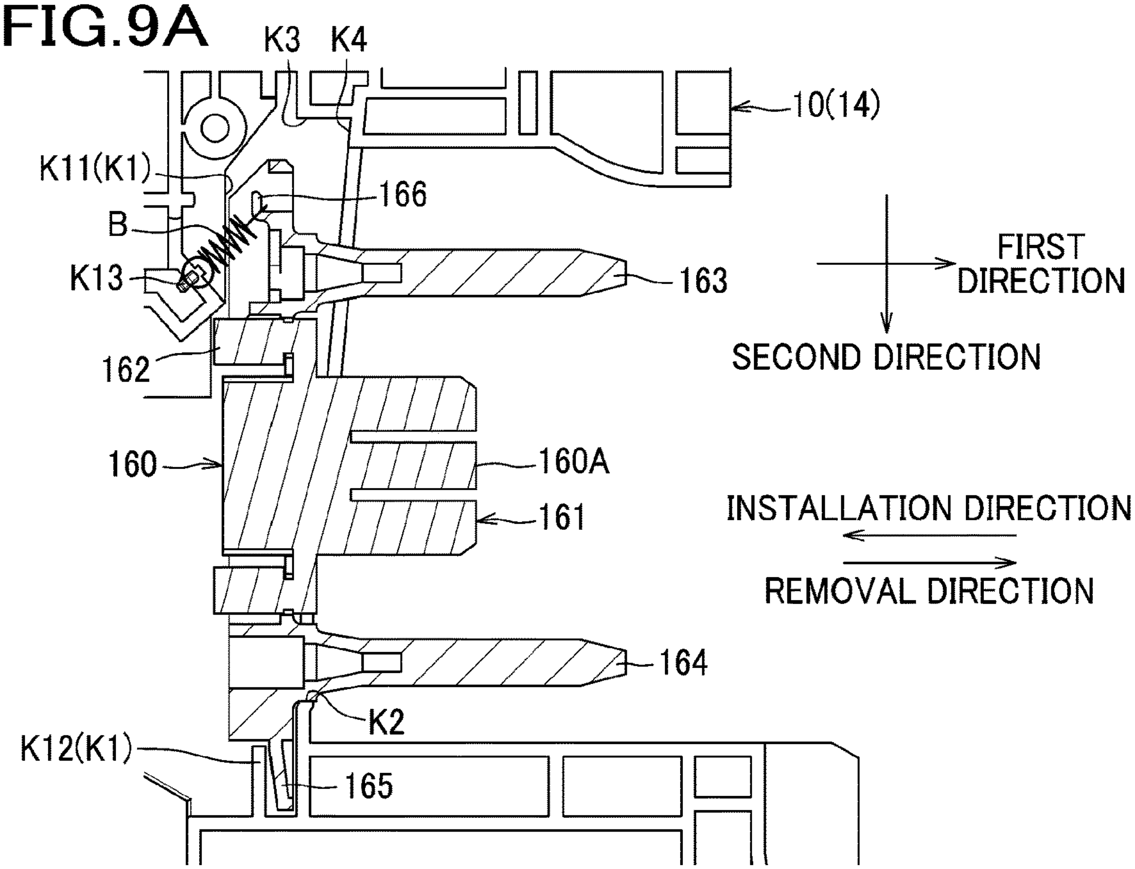
FIG. 9A is an illustration showing an initial position of the frame-side connector.
Figure 9B:
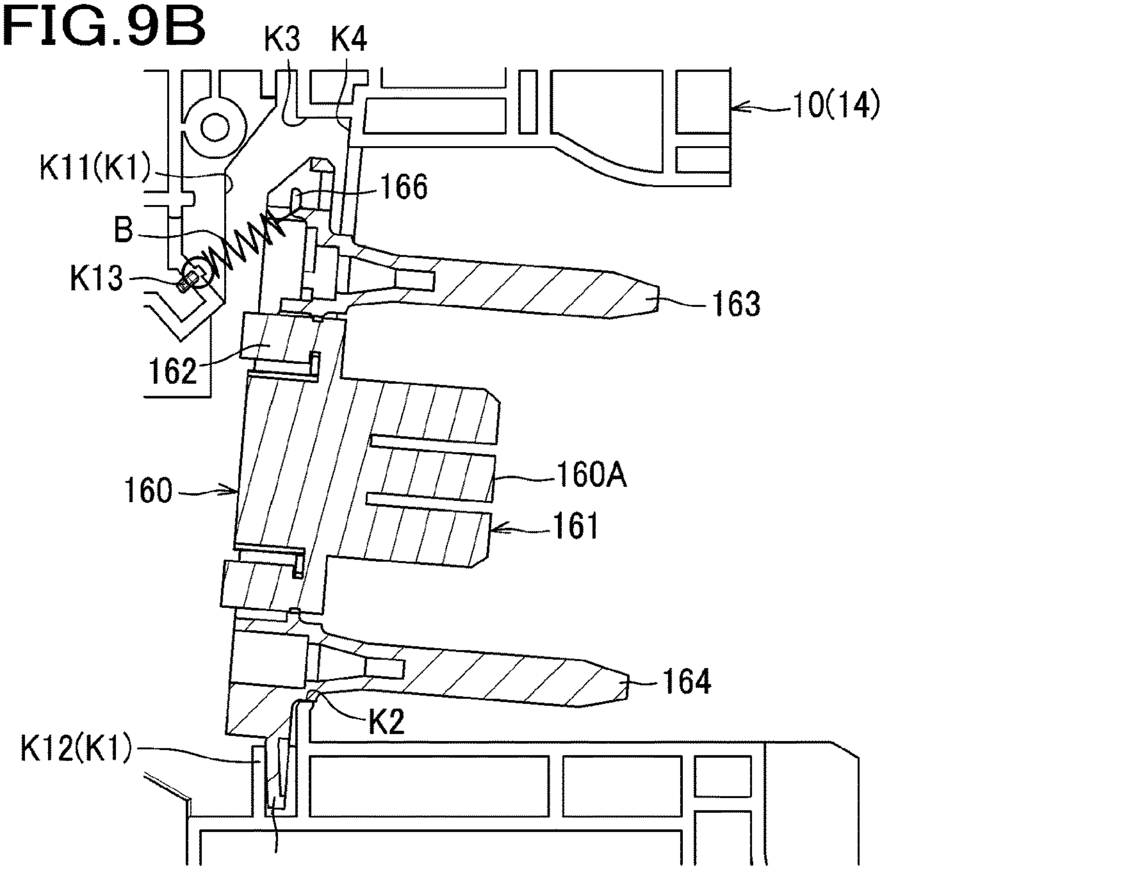
FIG. 9B is an illustration showing a tilted position of the frame-side connector.

As shown in FIGS. 9A, 9B, the first restriction portion K1 is a wall extending in a direction perpendicular to the first direction. The first restriction portion K1 restricts the range of movement of the frame-side connector 160. The first restriction portion K1 is located on the other side in the first direction relative to the frame-side connector 160. The first restriction portion K1 faces the upstream side in the installation direction of the fixing device 80 and is contactable with the frame-side connector 160. The first restriction portion K1 contacts the base 162 when the fixing device 80 is located in the installation position, and thereby restricts the frame-side connector 160 from moving toward the other side in the first direction. The first restriction portion K1 includes a first wall K11 and a second wall K12. The first wall K11 is a wall contactable with the base 162 of the frame-side connector 160. The second wall K12 is a wall disposed further toward the one side in the second direction relative to the first wall K11 and contactable with the projection 165 of the frame-side connector 160. The first wall K11 of the first restriction portion K1 is provided with a hook portion K13 to which the spring B is hooked.

The second restriction portion K2 is a wall extending in the second direction. The second restriction portion K2 is disposed on the one side in the first direction with respect to the second wall K12 and apart from the second wall K12 by a predetermined distance. The second restriction portion K2 restricts the range of movement of the frame-side connector 160. The second restriction portion K2 is located on the one side in the second direction relative to the frame-side connector 160. The second restriction portion K2 is contactable with the frame-side connector 160 from the one side in the second direction. When the fixing device 80 is not installed, the second restriction portion K2 contacts a vicinity of a root of the second guide pin 164 to restrict the frame-side connector 160 from moving toward the one side in the first direction. Specifically, an end of the second restriction portion K2 on the other side in the second direction contacts the vicinity of the root of the second guide pin 164.

As shown in FIG. 8, the projection 165 of the frame-side connector 160 is received between the second wall K12 and the second restriction portion K2. As shown in FIG. 9A, in a state where the fixing device 80 is located in the installation position, the second restriction portion K2 contacts the projection 165 of frame-side connector 160 from the one side in the first direction to restrict the frame-side connector 160 from moving toward the one side in the first direction. Accordingly, the second wall K12 of the first restriction portion K1 and the second restriction portion K2 serve as a retainer for the frame-side connector 160.

As shown in FIG. 9B, the frame-side connector 160 is configured to tilt with the vicinity of the root of the second pin 164 in contact with the second restriction portion K2 serving as a fulcrum so that the first surface 160A of the first connector housing 161 faces the one side in the second direction. In other words, when the frame-side connector 160 moves from the installation position, the upper end portion of the frame-side connector 160 moves upstream in the installation direction and tilts with the vicinity of the root of the second guide pin 164 in contact with the second restriction portion K2 serving as a fulcrum. It is to be understood that although there is no precise center of rotation of the swaying motion of the frame-side connector 160, the swaying motion of the frame-side connector 160 is defined by the upper end portion of the frame-side connector 160 moving more than the lower end portion of the frame-side connector 160 with the projection 165 received between the second wall K12 and the second restriction portion K2.

The third restriction portion K3 is spaced apart from the frame-side connector 160 in the second direction when the frame-side connector 160 is in contact with the second restriction portion K2. The third restriction portion K3 is a wall extending in a direction perpendicular to the second direction. The third restriction portion K3 is disposed on the other side in the second direction relative to the frame-side connector 160. The third restriction portion K3 is contactable with the frame-side connector 160 from the other side in the second direction. The third restriction portion K3 contacts the base 162 of the frame-side connector 160 to restrict the frame-side connector 160 from moving toward the other side in the second direction when the fixing device 80 is located in the installation position.

The fourth restriction portion K4 is a portion of the main frame 10 spaced apart from a part of the frame-side connector 160 distant from the second restriction portion K2 to the one side in the first direction when the frame-side connector 160 is in contact with the first restriction portion K1. The fourth restriction portion K4 is located on the one side in the first direction relative to the frame-side connector 160. The fourth restriction portion K4 is a slanted wall that extends toward the other side in the first direction as the fourth restriction portion K4 extends toward the one side in the second direction. The fourth restriction portion K4 is contactable with the upper end portion of the frame-side connector 160 from the one side in the first direction. The fourth restriction portion K4 contacts the upper end portion of the base 162 of the frame-side connector 160 to restrict the frame-side connector 160 from moving toward the one side in the first direction.

Figure 10A:
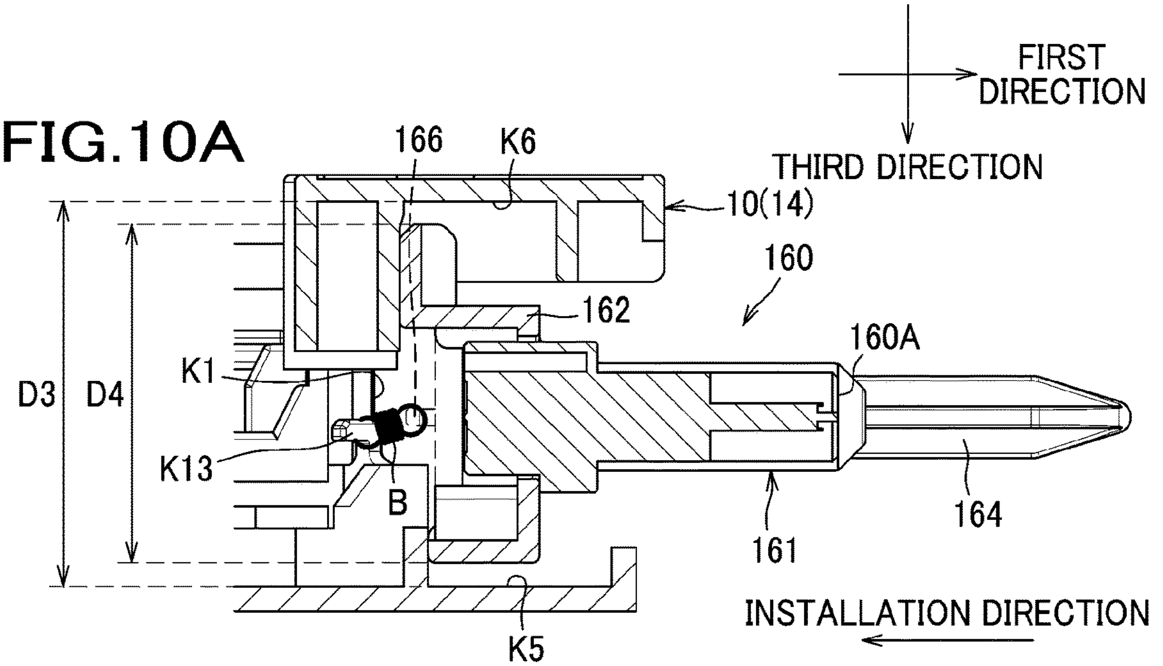
FIGS. 10A, 10B, 10C are illustrations of the frame-side connector as viewed from above, showing the positions to which the frame-side connector is movable in the third direction.
Figure 10B:
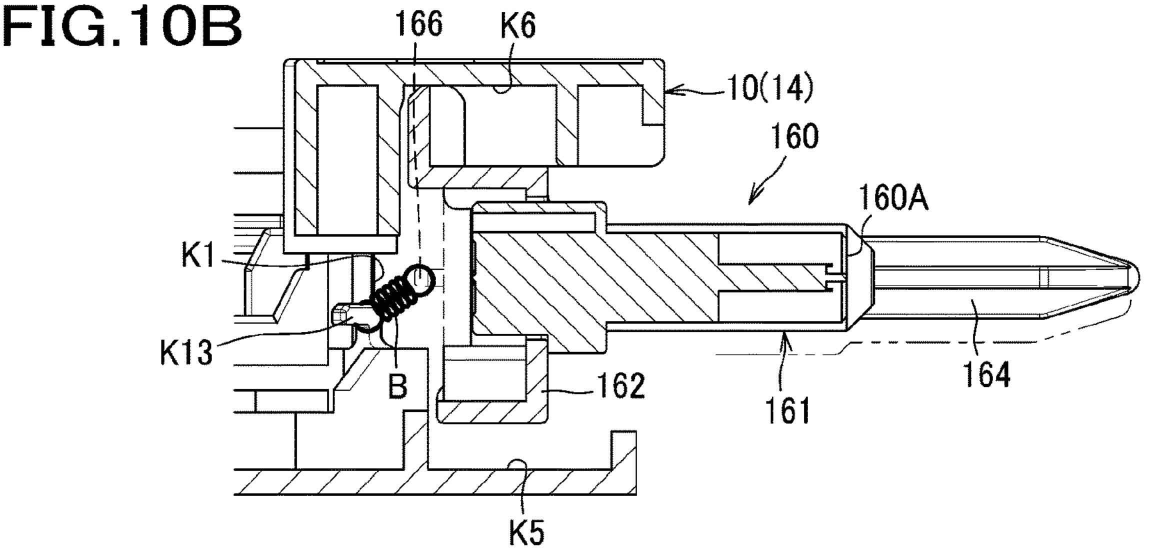
Figure 10C:
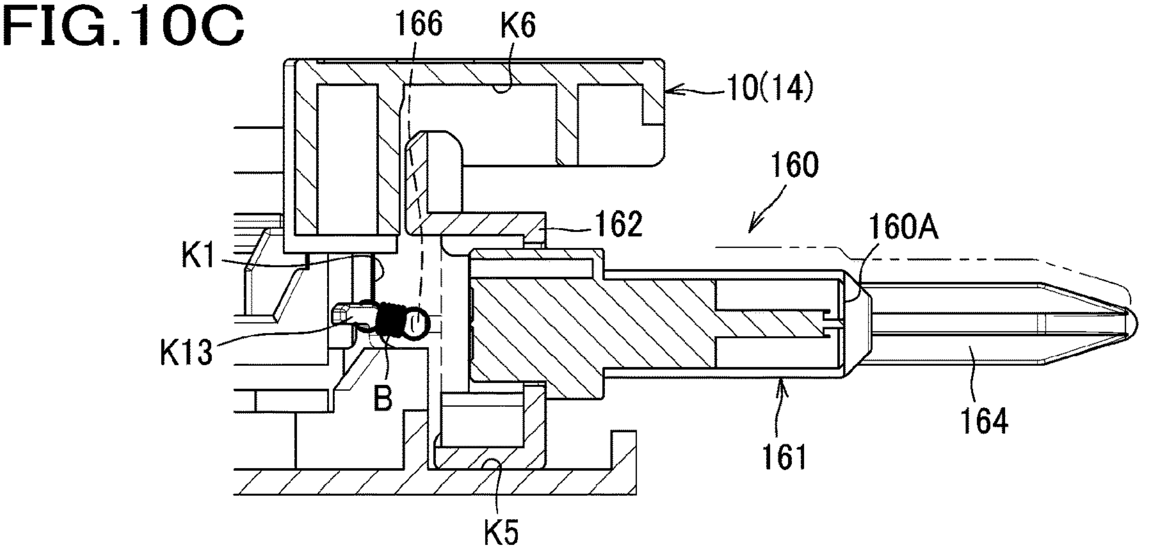

As shown in FIGS. 10A, 10B, 10C, the fifth restriction portion K5 restricts the range of movement of the frame-side connector 160. The fifth restriction portion K5 is a wall extending in a direction perpendicular to the third direction. The fifth restriction portion K5 is disposed on the one side in the third direction relative to the frame-side connector 160. The fifth restriction portion K5 is contactable with the frame-side connector 160 from the one side in the third direction. The fifth restriction portion K5 contacts the base 162 of the frame-side connector 160 to restrict the frame-side connector 160 from moving toward the one side in the third direction.

The sixth restriction portion K6 restricts the range of movement of the frame-side connector 160. The sixth restriction portion K6 is spaced apart from the fifth restriction portion K5 in the third direction by a predetermined distance. The sixth restriction portion K6 is a wall extending in a direction perpendicular to the third direction. The sixth restriction portion K6 is located on the other side in the third direction relative to the frame-side connector 160. The sixth restriction portion K6 is contactable with the frame-side connector 160 from the other side in the third direction. The sixth restriction portion K6 contacts the base 162 of the frame-side connector 160 to restrict the frame-side connector 160 from moving toward the other side in the third direction. A distance D3 from the fifth restriction portion K5 to the sixth restriction portion K6 is greater than the dimension D4 of the frame-side connector 160 in the third direction (D4<D3).

The spring B is a tension spring. The spring B is engaged with the hook portion K13 of the main frame 10 at one end thereof, and is engaged with the hook portion 166 of the frame-side connector 160 at the other end thereof. The spring B constantly biases the frame-side connector 160 toward the first restriction portion K1 and toward the second restriction portion K2.

As shown in FIGS. 9A, 9B, the hook portion K13 of the first restriction portion K1 and the hook portion 166 of the frame-side connector 160 are located closer to the third restriction portion K3 than to the second restriction portion K2 in the second direction. That is, the hook portion K13 and the hook portion 166 are located farther from the second restriction portion K2 than from a central portion of the base portion 162 in the second direction.

Figure 11A:
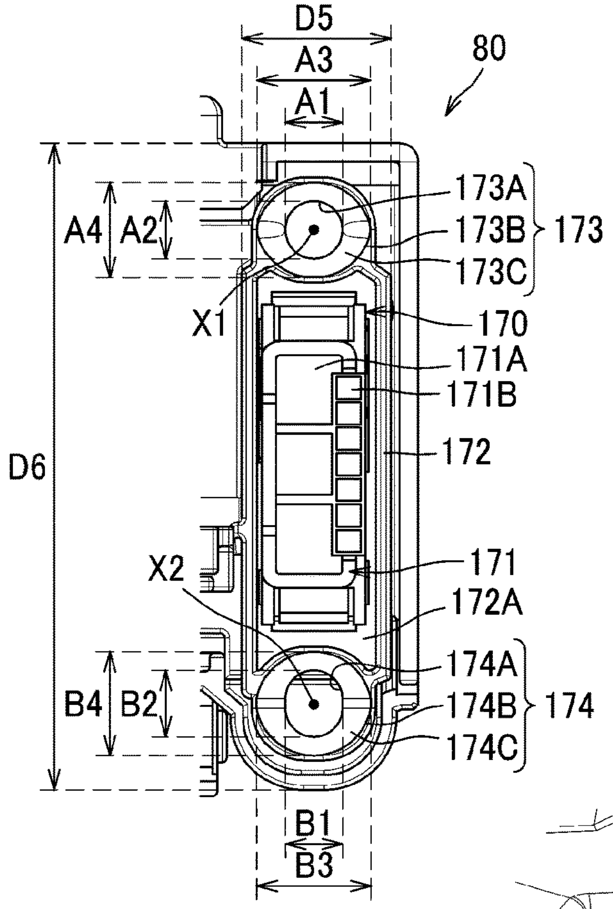
FIG. 11A is an illustration showing a unit-side connector as viewed from upstream in an installation direction.
Figure 11B:
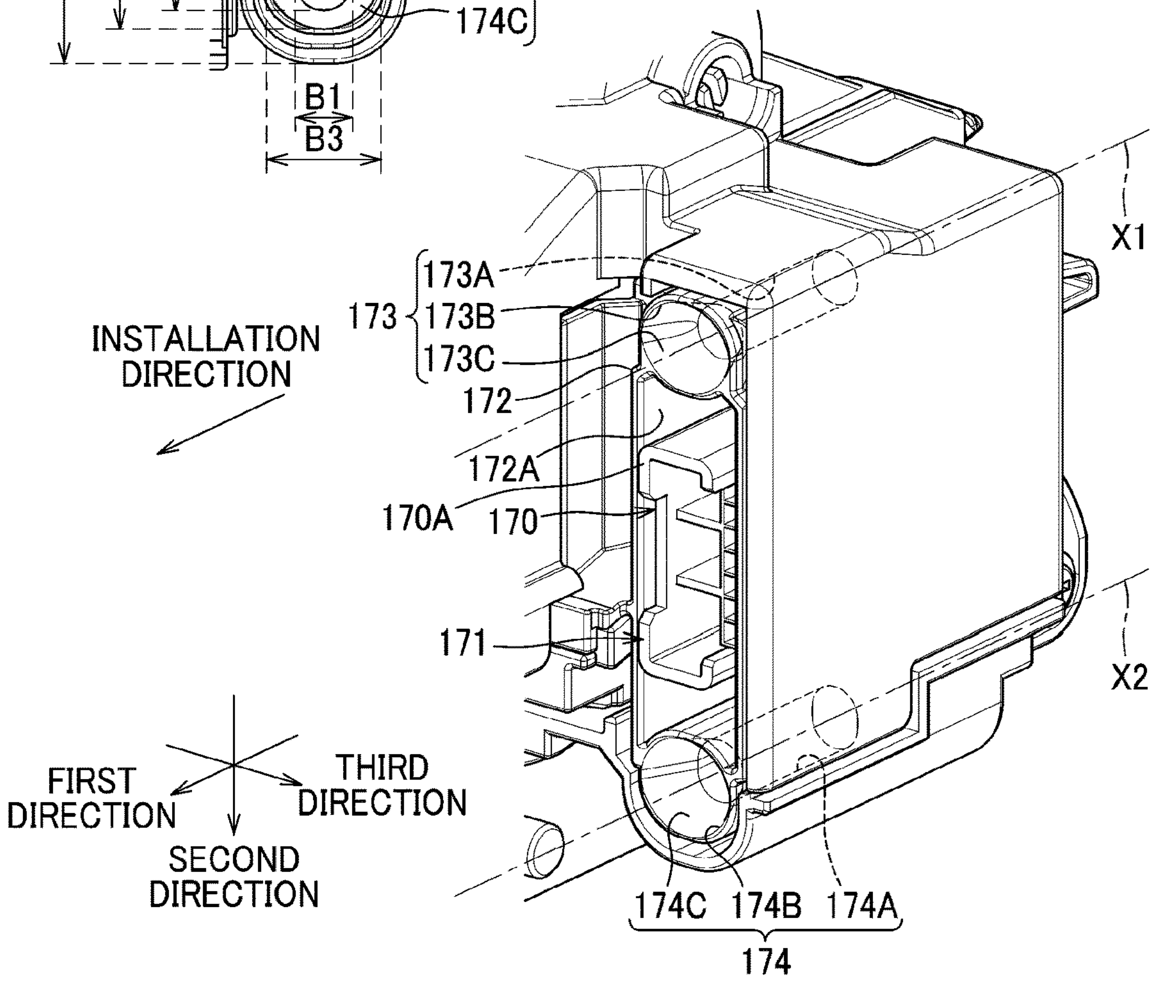
FIG. 11B is a perspective view of the unit-side connector as viewed from upstream in an installation direction.

As shown in FIGS. 11A, 11B, the unit-side connector 170 is a fixed connector that is not movable relative to the fixing housing 100. The dimension D6 of the unit-side connector 170 in the second direction is greater than the dimension D5 of the unit-side connector 170 in the third direction (D5<D6). The unit-side connector 170 comprises a second connector housing 171, a base 172, a first guide hole 173, a second guide hole 174, and a second surface 170A. The first guide hole 173 and the second guide hole 174 are an example of a to-be-engaged portion that engages the guide pin 163 and the second guide pin 164 as an example of an engagement portion.

The second connector housing 171 is a portion of the unit-side connector 170 that holds terminals and interfits with the first connector housing 161. The second connector housing 171 includes three heater terminals 171A aligned in the second direction, and seven sensor terminals 171B aligned in the second direction. The heater terminals 171A and the sensor terminals 171B are located side by side in the third direction. The second connector housing 171 is located between the first guide hole 173 and the second guide hole 174 in the second direction. The second connector housing 171 interfits with the first connector housing 161 when the fixing device 80 is installed in the main frame 10. The second surface 170A is a surface of the second connector housing 171 facing downstream in the installation direction of the fixing device 80. The second surface 170A is opposed to the first surface 160A of the first connector housing 161 in a process in which the frame-side connector 160 and the unit-side connector 170 are engaged with each other.

The base 172 has a lower end (lower end portion) facing the one side in the second direction and an upper end (upper end portion) facing the other side in the second direction. The base 172 includes a retaining portion 172A located at a central portion thereof in the second direction. The retaining portion 172A holds the second connector housing 171. The second connector housing 171 fits in the retaining portion 172A.

The first guide hole 173 is a hole formed in the upper end portion of the base 172. The first guide hole 173 extends in the installation direction. The first guide hole 173 is a hole in which the first guide pin 163 is inserted. When the fixing device 80 is being inserted into the main frame 10, the first guide hole 173 engages the first guide pin 163 before the second connector housing 171 contacts the first connector housing 161. The first guide hole 173 includes a first cylindrical portion 173A, a first inlet 173B, and a first conical portion 173 C.

The first cylindrical portion 173A is a cylindrical hole extending in the first direction. The first cylindrical portion 173A with the first guide pin 162 received therein restricts the position of the unit-side connector 170 relative to the frame-side connector 160. The dimension A1 of the hole of the first cylindrical portion 173A in the third direction is the same as the dimension A2 of the hole in the second direction (A1=A2).

The first inlet 173B is located at an end of the first guide hole 173 at the one side in the first direction. The first inlet 173B is greater than the first cylindrical portion 173A.

Specifically, the dimension A3 of a hole of the first inlet 173B in the third direction is greater than the dimension A1 of the hole of the first cylindrical portion 173A in the third direction (A1<A3). The dimension A4 of the hole of the first inlet 173B in the second direction is greater than the dimension A2 of the hole of the first cylindrical portion 173A in the second direction (A2<A4). Further, in a plane perpendicular to a direction of an axis X1 of the first cylindrical portion 173A, the dimension A3 of the hole of the first inlet 173B in the third direction is greater than the dimension A4 of the hole of the first inlet 173B in the second direction (A4<A3).

The first conical portion 173C has a conical surface connecting the first inlet 173B and the first cylindrical portion 173A. The first conical portion 173C is contactable with the end of the first guide pin 163 and guides the first guide pin 163 from the first inlet 173B to the first cylindrical portion 173A.

The second guide hole 174 is a hole formed in the lower end portion of the base 172. The second guide hole 174 extends in the installation direction. The second guide hole 174 is a hole in which the second guide pin 164 is inserted. When the fixing device 80 is being installed into the main frame 10, the second guide hole 174 engages the second guide pin 164 before the second connector housing 171 contacts the first connector housing 161. The second guide hole 174 includes a second cylindrical portion 174A, a second inlet 174B, and a second conical portion 174 C.

The second cylindrical portion 174A is a cylindrical long hole extending in the first direction. The second cylindrical portion 174A with the second guide pin 164 received therein restricts the position of the unit-side connector 170 relative to the frame-side connector 160. The dimension B2 of the hole of the second cylindrical portion 174A in the second direction is greater than the dimension B1 of the hole of the second cylindrical portion 174A in the third direction (B1<B2).

The second inlet 174B is located at an end of the second guide hole 174 at the one side in the first direction. The second inlet 174B is greater than the second cylindrical portion 174A. Specifically, the dimension B3 of a hole of the second inlet 174B in the third direction is greater than the dimension B1 of the hole of the second cylindrical portion 174A in the third direction (B1<B3). The dimension B4 of the hole of the second inlet 174B in the second direction is greater than the dimension B2 of the hole of the second cylindrical portion 174A in the second direction (B2<B4). Further, in a plane perpendicular to a direction of an axis X2 of the second cylindrical portion 174A, the dimension B3 of the hole of the second inlet 174B in the third direction is greater than the dimension B4 of the hole of the second inlet 174B in the second direction (B4<B3).

The second conical portion 174C has a conical surface connecting the second inlet 174B and the second cylindrical portion 174A. The second conical portion 174C is contactable with the end of the second guide pin 164 and guides the second guide pin 164 from the second inlet 174B to the second cylindrical portion 174A.

Next, an operation of installing and removing the fixing device 80 will be described. First, the process of attaching the fixing device 80 to the main frame 10 will be described.

In this embodiment, the fixing device 80 is installed into the main frame 10 by a first process, a second process, and a third process. In the following description regarding the first, second and third processes, only one of the first reference portion 120 and the second reference portion 130, and their corresponding guiding structures will be described with reference to FIGS. 5A to 7B and FIGS. 12A to 14B.

The first process is a process in which the first reference portion 120 is guided by the first guide surface G1. Specifically, the first process is a process in which the fixing device 80 slides in the installation direction (first direction) into the main frame 10. In more detail, the first process is a process from the state shown in FIG. 5A, followed by the state shown in FIG. 5B, to the state shown in FIG. 6A. When the fixing device 80 is moved in the installation direction from the state shown in FIG. 5A, the first reference portion 120 contacts the first guide surface G1 as shown in FIG. 5B. The fixing device 80 thereby slides in the installation direction along the first guide surface G1 and is guided into the main frame 10.

Figure 6A:
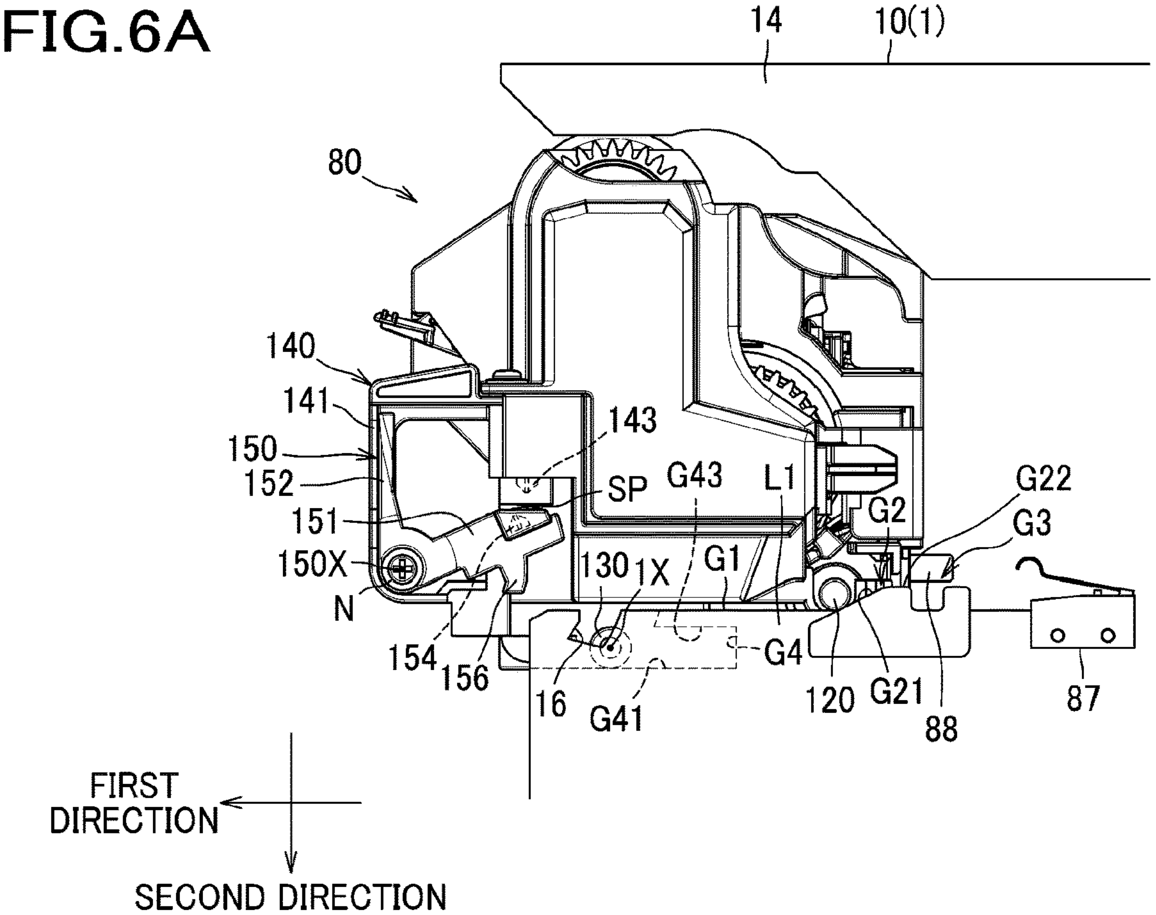
FIG. 6A is an illustration showing the process of installing the fixing device into the main frame with the first reference portion contacting an inclined surface.

When the fixing device 80 is moved further in the installation direction from the state shown in FIG. 5B, the second reference portion 130 enters the second recess G4 and contacts the restriction surface G41 as shown in FIG. 6A. After contacting the restriction surface G41, the fixing device 80 is guided toward the installation position by the restriction surface G41. That is, the fixing device 80 is guided toward the installation position by the first reference portion 120 contacting the first guide surface G1 and the second reference portion 130 contacting the restriction surface G41. Since the first guide surface G1 and the restriction surface G41 are parallel to each other, the fixing device 80 slides straight in the first direction without rotating until the first reference portion 120 contacts the second guide surface G21. As described above, the process from the start of installation of the fixing device 80 until the first reference portion 120 contacts the second contact surface G21 is the first process.

Figure 12A:
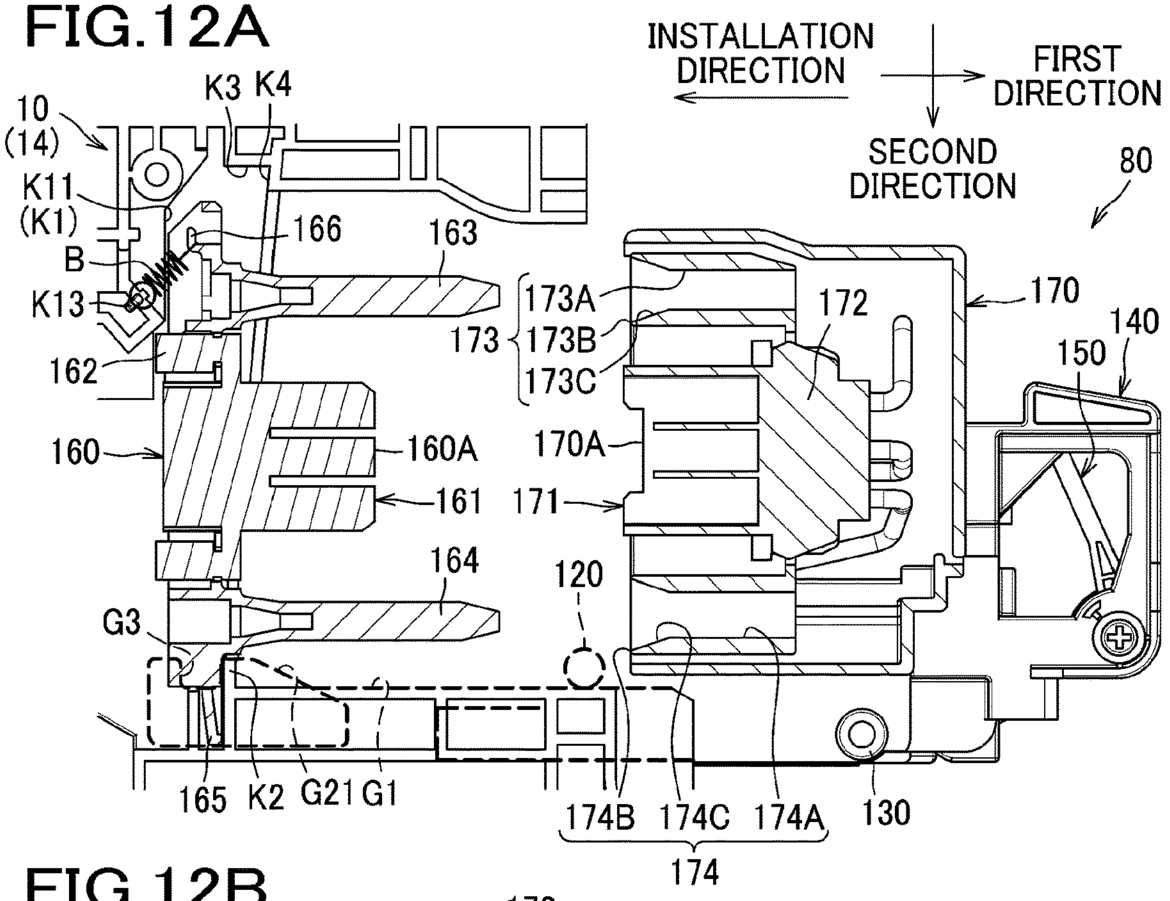
FIGS. 12A, 12B are illustrations showing the states of the frame-side connector and the unit-side connector in the first process.

As shown in FIG. 12A, in the first process, the first surface 160A of the frame-side connector 160 faces the one side in the first direction, i.e., upstream in the installation direction.

Figure 12B:
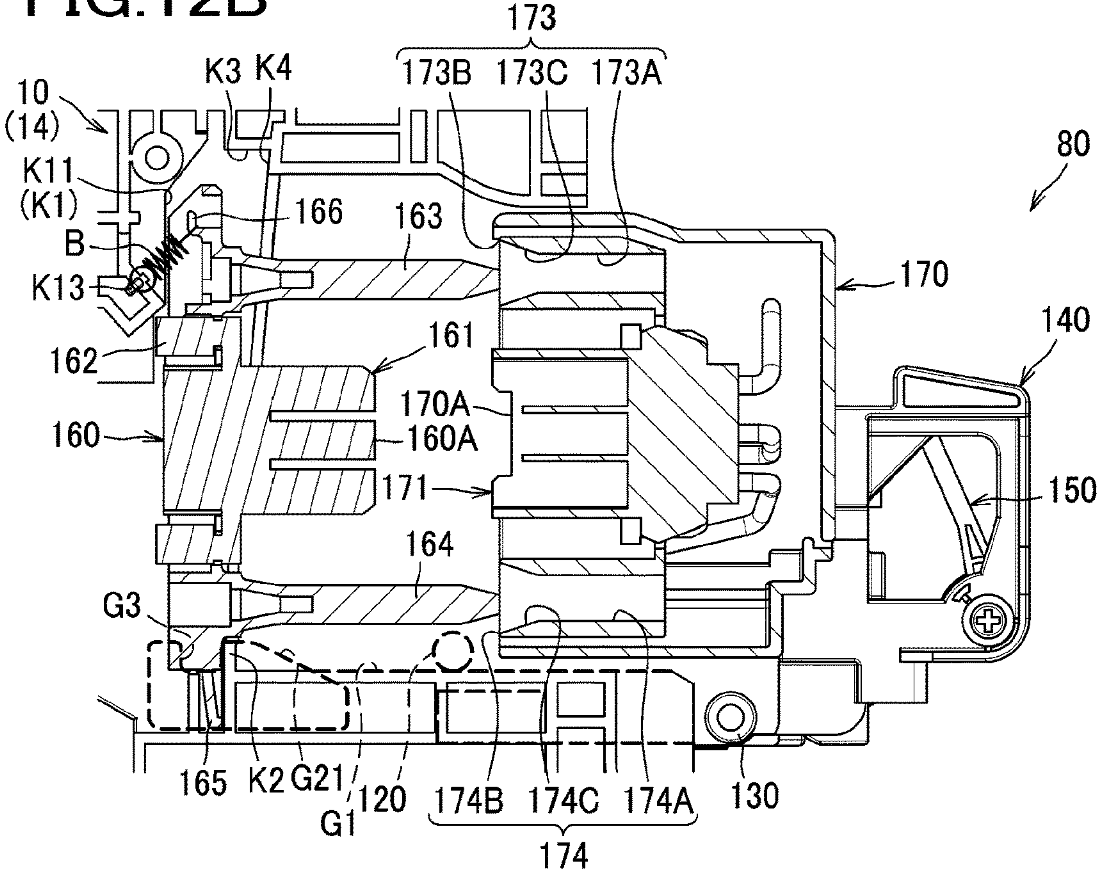

Then, as shown in FIG. 12B, the first guide pin 163 enters the first inlet 173B of the first guide hole 173, and the second guide pin 164 enters the second inlet 174B of the second guide hole 174.

Figure 13A:
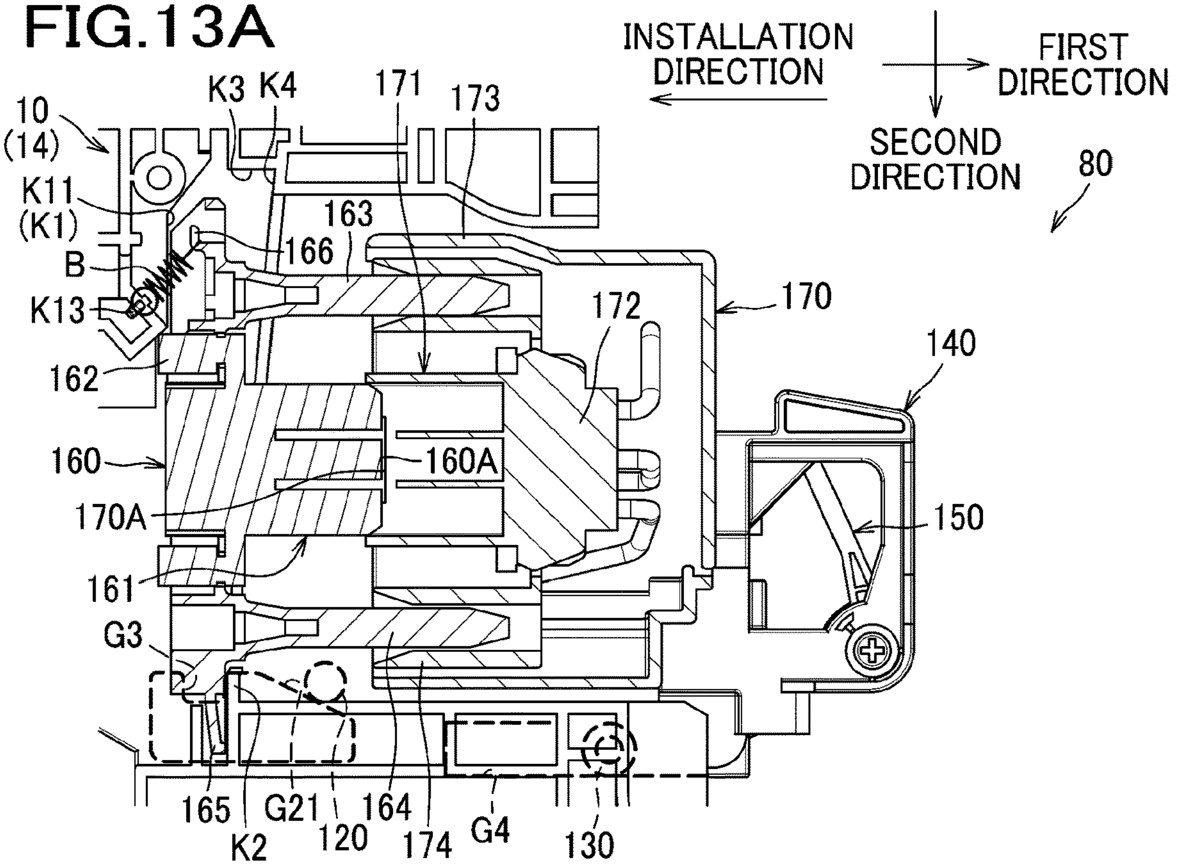
FIGS. 13A, 13B are illustrations showing the states of the frame-side connector and the unit-side connector in the second process.

Subsequently, as shown in FIG. 13A, the end of the first guide pin 163 is guided by the first conical portion 173C of the first guide hole 173 and received in the first cylindrical portion 173A, and the end of the second guide pin 164 is guided by the second conical portion 174C of the second guide hole 174 and received in the second cylindrical portion 174A. In this way, the frame-side connector 160 and the unit-side connector 170 are opposed in the first direction and engage each other in the process in which the unit is installed in the main frame 10.

Figure 6B:
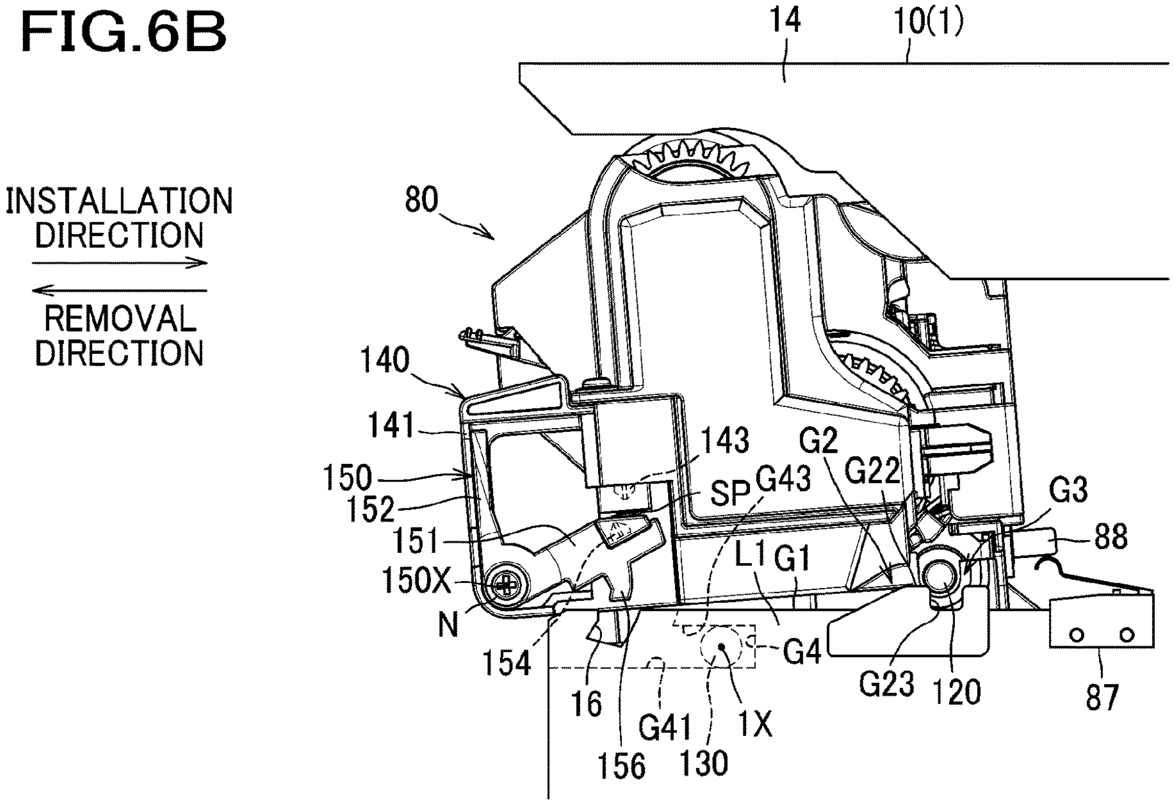
FIG. 6B is an illustration showing the process of installing the fixing device into the main frame with the first reference portion moved past an upper end surface.

The second process is a process following the first process, in which the first reference portion 120 moves while being guided by the second guide surface G21. Specifically, as shown in FIG. 6A, when the fixing device 80 is moved further in the installation direction in a state where the first reference portion 120 is in contact with the second guide surface G21, the first reference portion 120 is lifted upward while the second reference portion 130 is held in the second recess G4. Thus, as the first reference portion 120 is guided by the second guide surface G21, the fixing device 80 moves in the installation direction while rotating in the counter-clockwise direction of FIG. 6B. In other words, as the fixing device 80 moves in the installation direction from the state shown in FIG. 6A, the fixing device 80 moves into the main frame 10 in a posture in which a downstream surface of the fixing device 80 in the installation direction faces diagonally upward, as shown in FIG. 6B.

Figure 13B:
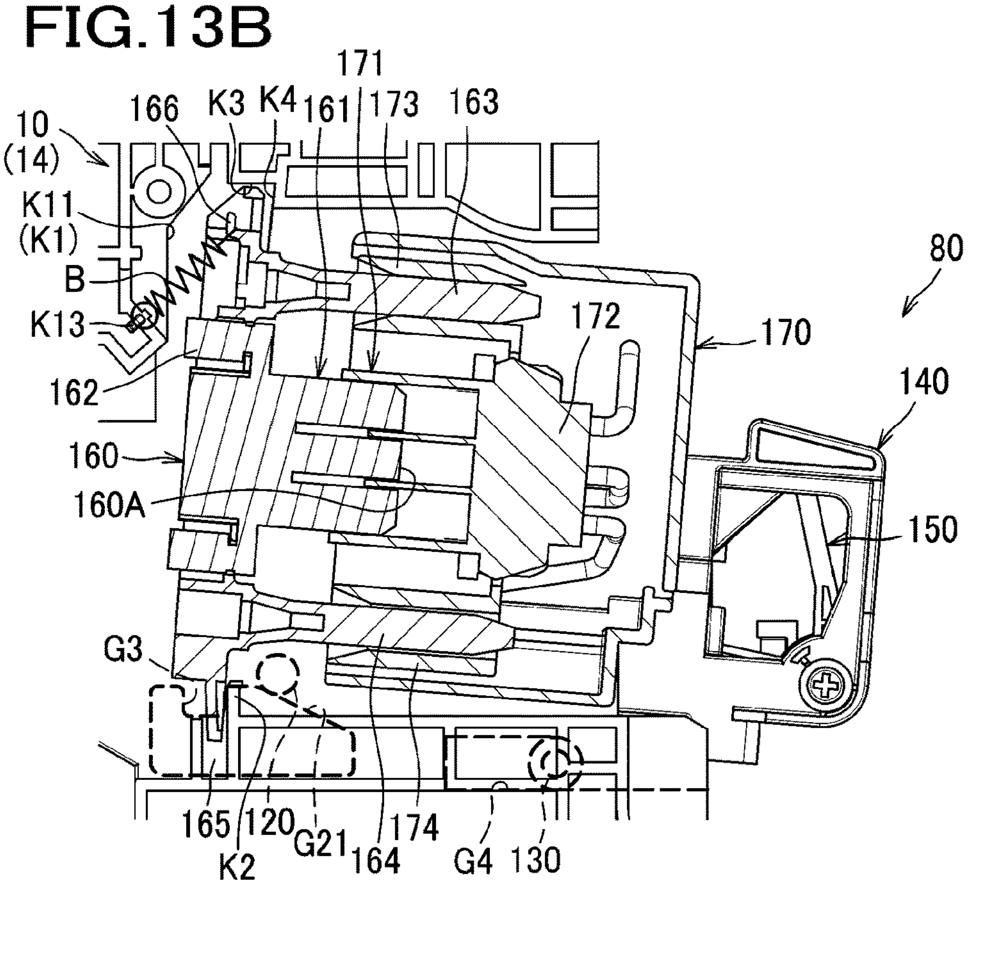

As shown in FIGS. 13A, 13B, in the second process, the frame-side connector 160 moves as the unit-side connector moves 170. That is, in the second process, the frame-side connector 160 tilts from the state shown in FIG. 13A to the state shown in FIG. 13B so that the first surface 160A faces the one side in the second direction as the unit-side connector 170 moves. The unit-side connector 170 is electrically connected to the frame-side connector 160 in the second process. Specifically, the terminals of the frame-side connector 160 and the terminals of the unit-side connector 170 contact each other and become electrically continuous. Thus, since the first reference portion 120 of the fixing device 80 slides along the second guide surface G21 and moves diagonally upward in the second process, the whole fixing device 80 rotates about the second reference portion 130.

The third process is a process following the second process, in which the first reference portion 120 is received in the first recess G3 and the fixing device 80 is located in the installation position. Specifically, from the state shown in FIG. 6A, the first reference portion 120 is guided by the second guide surface G21, and then guided along the first direction by the upper end surface G22. Since the part of the fixing device 80 located downstream of the first axis 1X in the installation direction is heavier than the part of the fixing device 80 located upstream of the first axis 1X in the installation direction, the first reference portion 120 enters the first recess G3 under the force of gravity, as shown in FIG. 7A, from the state shown in FIG. 6B, after the first reference portion 120 moves past the upper end surface G22. At this point, since the second reference portion 130 is still held in the second recess G4, the fixing device 80 moves to the installation position by rotating about the first axis 1X in the clockwise direction.

As described above, the process in which the fixing device 80 moves to the installation direction by rotating about the first axis 1X is the third process. That is, in the third process, the fixing device 80 moves to the installation position by a movement different from the movement of the fixing device 80 in the first process. In the third process, the switch contacting portion 88 moves downward. The switch contacting portion 88 does not contact the interlock switch 87 in the first process, but the switch contacting portion 88 contacts the interlock switch 87 in the third process to set the interlock switch from the off-state to the on-state.

If the user removes his/her hand from the lever 150 while the fixing device 80 is in the installation position, the lever 150 moves from the second position shown in FIG. 7A to the first position shown in FIG. 7B by the biasing force of the spring SP. As shown in FIG. 7B, when the lever 150 moves to the first position, the engagement portion 156 enters the engagement hole 16, and the fixing device 80 cannot be disengaged from the main frame 10 unless the user grasps the lever 150.

Figure 14A:
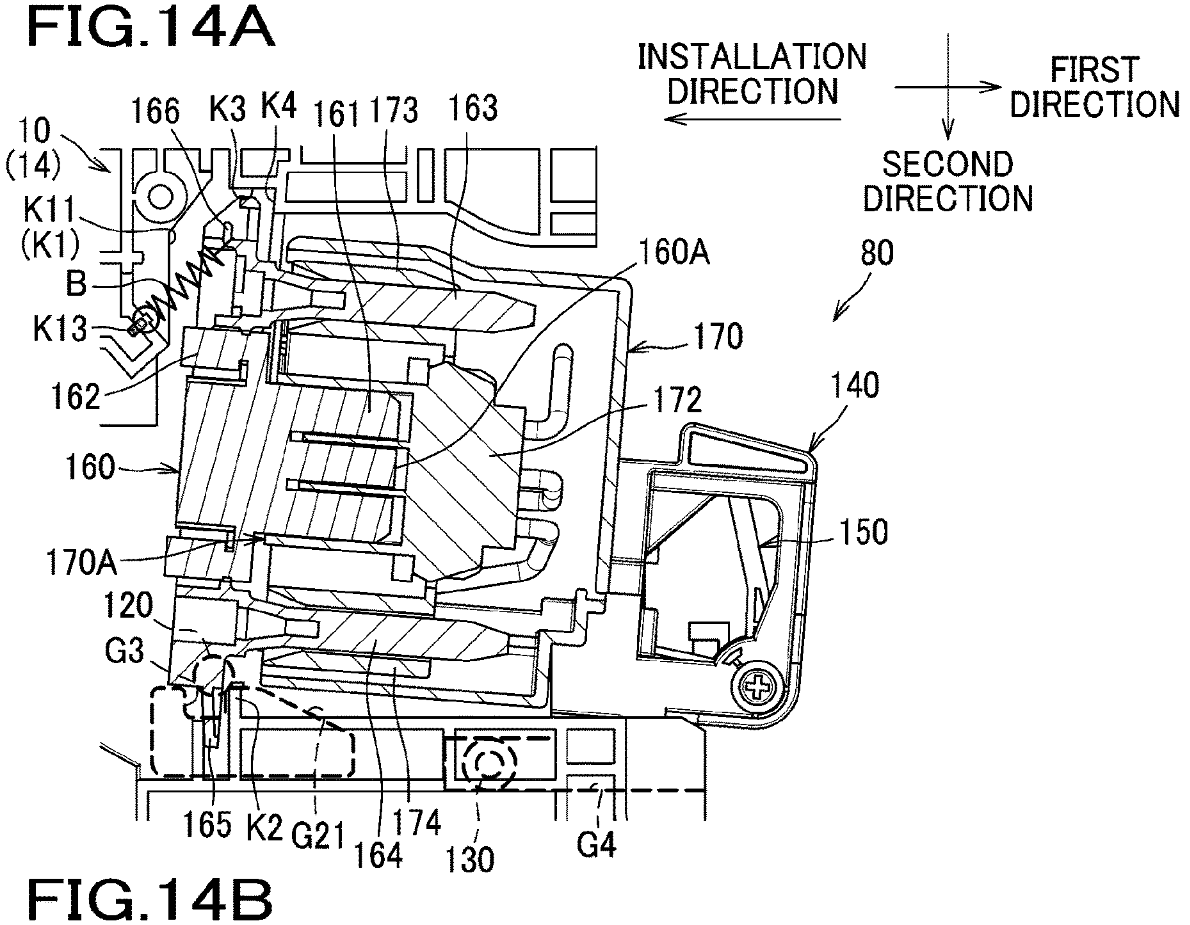
FIGS. 14A, 14B are illustrations showing the states of the frame-side connector and the unit-side connector in the third process.
Figure 14B:
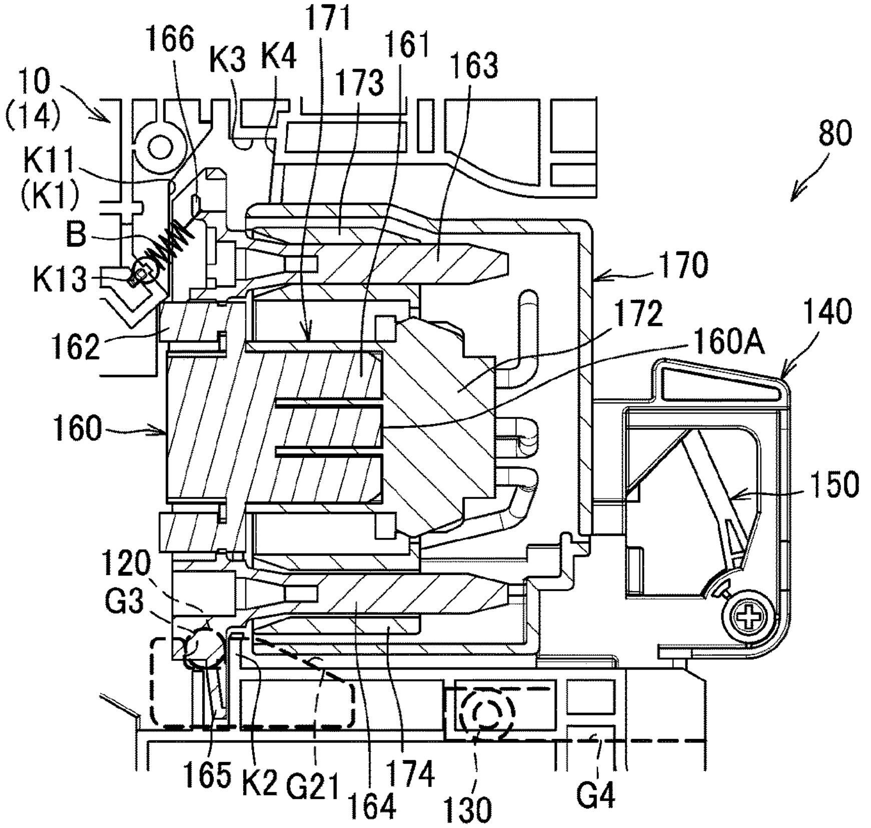

As shown in FIGS. 14A and 14B, in the third process, the frame-side connector 160 moves as the unit-side connector 170 moves. Specifically, in the third process, the first reference portion 120 enters the first recess G3, causing the first reference portion 120 to move downward from the state shown in FIG. 14A, and causing the fixing device 80 to be located in the installation position as shown in FIG. 14B. At this point, the first surface 160A of the frame-side connector 160, which was tilted to face the one side in the second direction, faces the one side in the first direction when the third process is completed and the unit is located in the installation position.

Next, the process of removing the fixing device 80 from the main frame 10 will be described.

In this embodiment, the fixing device 80 is removed from the main frame 10 by a fourth process, a fifth process, and a sixth process. The fourth process corresponds to the third process. The fifth process corresponds to the second process. The sixth process corresponds to the first process.

When the fixing device 80 is located in a fixing position, the engagement portion 156 of the lever 150 is engaged with the engagement hole 16. As shown in FIG. 7A, when the user grasps the lever 150 and rotates the lever 150 in the counterclockwise direction, the lever 150 moves from the first position to the second position, and the engagement portion 156 received in the engagement hole 16 moves out of the engagement hole 16. The fixing device 80 thereby becomes disengageable from the main frame 10.

The fourth process is a process in which the first reference portion 120 moves out of the first recess G3 from a state where the fixing device 80 is located in the installation position. Specifically, in the fourth process, the user pulls down the grip 141 and the holding portion 152 while grasping the grip 141 and the holding portion 152. As a result, the fixing device 80 rotates, as shown in FIG. 6B, about the first axis 1X in the counterclockwise direction. At this point, the fixing device 80 rotates in a direction in which the lever axis 150X moves downward and the first reference portion 120 moves upward. Since the first reference portion 120 moves out of the first recess G3 as a result of this rotation, the first reference portion 120 is not restricted by the reference surface G23 and the fixing device 80 becomes movable in the removal direction.

As shown in FIGS. 14A, 14B, in the fourth process, the frame-side connector 160 moves as the unit-side connector 170 moves even when the fixing device 80 rotates. Thus, the electrical continuity of the frame-side connector 160 and the unit-side connector 170 is maintained.

The fifth process is a process following the fourth process, in which the fixing device 80 slides in the removal direction and the first reference portion 120 moves while being guided by the second guide surface G21. Specifically, the user pulls the fixing device 80 in the removal direction in the state shown in FIG. 6B while grasping the grip 141 and the holding portion 152. As a result, the fixing device 80 moves in the removal direction as shown in FIG. 6A, and the first reference portion 120 contacts the second guide surface G21. As the first reference portion 120 is guided by the second guide surface G21, the fixing device 80 rotates in the clockwise direction. As shown in FIGS. 13A, 13B, the electrical connection between the frame-side connector 160 and the unit-side connector 170 is shut off in the fifth process.

The sixth process is a process following the fifth process, in which the first reference portion 120 moves while being guided by the first guide surface G1. Specifically, when the grip 141 is pulled further in the removal direction, the fixing device 80 moves further in the removal direction, and the first reference portion 120 contacts the first guide surface G1 as shown in FIG. 5B. At this point, since the second reference portion 130 is held in the second recess G4, the fixing device 80 is guided toward the outside of the main frame 10 with the first reference portion 120 contacting the first guide surface G1 and the second reference portion 130 contacting the restriction surface G41. Since the first guide surface G1 and the restriction surface G41 are parallel to each other, the fixing device 80 does not rotate and moves straight in the first direction. As shown in FIGS. 12A, 12B, the frame-side connector 160 and the unit-side connector 170 are disengaged in the sixth process.

According to the above, the following advantageous effects can be obtained by the present embodiment.

As described above, the fixing device 80 of the present embodiment is installed in the main frame 10 by the first process, the second process, and the third process. After the unit-side connector 170 is engaged with the frame-side connector 160 in the first process, the frame-side connector 160 is configured to move as the unit-side connector 170 moves. Thus, the frame-side connector 160 and the unit-side connector 170 can be easily engaged even if the movement trajectory of the fixing device 80 being installed into the main frame 10 is complicated.

The first guide pin 163 and the first guide hole 173 are engaged and the second guide pin 164 and the second guide hole 174 are engaged before the second connector housing 171 contacts the first connector housing 161. Thus, the second connector housing 171 can be appropriately guided to the first connector housing 161. Further, since the ends of the first guide pin 163 and the second guide pin 164 protrude further outward than the first connector housing 161, the first connector housing 161 can be restrained from contacting other components.

The first surface 160A of the first connector housing 161 faces the first direction in the first process, and the first surface 160A tilts to face the one side in the second direction in the second process. Thus, frame-side connector 160 and the unit-side connector 170 are not easily disengaged even if the movement trajectory of the unit is changed in a state where the frame-side connector 160 and the unit-side connector 170 are engaged with each other.

Since the first surface 160A faces the first direction after the third process is completed, the posture of the fixing device 80 at the start of installation and the posture of the fixing device 80 after the completion of installation can be made almost the same.

The first guide hole 173 includes a first cylindrical portion 173A, a first inlet 173B, and a first conical portion 173C. In a plane perpendicular to an axial direction of the first cylindrical portion 173A, the dimension A3 of the first inlet 173B in the third direction is greater than the dimension A4 of the first inlet 173B in the second direction (A4<A3). Thus, the first conical portion 173C can be restrained from becoming greater in the second direction, and the unit-side connector 170 can be easily engaged with the frame-side connector 160 even if the unit-side connector 170 is slightly misaligned in the third direction when the fixing device 80 is being installed into the main frame 10.

Since the frame-side connector 160 comprises a spring B that is engaged with the restriction portion, the frame-side connector 160 is biased toward the restriction portion before the frame-side connector 160 and the unit-side connector 170 are engaged. Thus, the frame-side connector 160 is movable in the process in which the frame-side connector 160 and the unit-side connector 170 are engaged. As a result, the frame-side connector 160 and the unit-side connector 170 can be easily engaged when the fixing device 80 is being installed into the main frame 10 even if the movement trajectory of the fixing device 80 being installed into the main frame 10 is complicated.

Since the frame-side connector 160 is movably held at the main frame 10 and the unit-side connector 170 is configured as a fixed connector that does not move, the fixing device 80 can be made more compact.

Since the frame-side connector 160 is configured to tilt, the frame-side connector 160 and the unit-side connector 170 can move as one unit even if the movement trajectory of the fixing device 80 being installed into the main frame 10 is complicated. As a result, the frame-side connector 160 and the unit-side connector 170 are not easily disengaged.

Two guide pins, the first guide pin 163 and the second guide pin 164, are provided. The first connector housing 161 is provided between the first guide pin 163 and the second guide pin 164. Further, two guide holes, the first guide hole 173 and the second guide hole 174, are provided. The second connector housing 171 is provided between the first guide hole 173 and the second guide hole 174. Accordingly, since the frame-side connector 160 and the unit-side connector 170 are engaged by the two guide pins and the two guide holes, the frame-side connector 160 and the unit-side connector 170 are stably engaged.

The cross section of the first cylindrical portion 173A of the first guide hole 173 is a round hole, and the cross section of the second cylindrical portion 174A of the second guide hole 174 is a long hole. Since the cross section of the second cylindrical portion 174A is a long hole, the second cylindrical portion 174A provides more space compared to the first cylindrical portion 173A, allowing the second guide pin 164 to be engaged more easily.

The frame-side connector 160 which is the movable connector includes the spring B that biases the frame-side connector 160 toward the first restriction portion K2 and toward the second restriction portion K2. Thus, before the frame-side connector 160 and the unit-side connector 170 are engaged, the frame-side connector 160 is biased toward both of the first restriction portion K1 and the second restriction portion K2. Since the frame-side connector 160 is movable in the process in which the frame-side connector 160 and the unit-side connector 170 are engaged, the frame-side connector 160 and the unit-side connector 170 can be easily engaged even if the movement trajectory of the fixing device 80 being installed into the man housing 10 is complicated.

Since the main frame 10 includes the third restriction portion K3, the frame-side connector 160 can be moved in the second direction between the second restriction portion K2 and the third restriction portion K3.

Since the frame-side connector 160 is configured to tilt, the frame-side connector 160 and the unit-side connector 170 can be easily engaged even when the fixing device 80 tilts during installation.

Since the main frame 10 includes a fourth restriction portion K4, the range in which the frame-side connector 160 tilts can be restricted.

The hook portion 166 of the frame-side connector 160 is located farther from the second restriction portion K2 than from a central portion of the frame-side connector 160 in the second direction. Thus, when the frame-side connector 160 tilts, the spring B biases a portion of the frame-side connector 160 spaced apart from the fulcrum of the frame-side connector 160. As a result, the spring B can efficiently bias the frame-side connector 160 so that the posture of the frame-side connector becomes stable.

Since the main frame 10 includes a fifth restriction portion K5 and a sixth restriction portion K6, movement of the frame-side connector 160 in the third direction is allowed while restricting the amount of movement of the frame-side connector 160 in the third direction. In this way, the frame-side connector 160 can move freely in the third direction to some extent.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below wherein components similar to the above-described configuration will be identified by the same reference characters and descriptions thereof will be omitted.

Although the fixing device 80 is given as an example of the unit installed into and removed from the main body of the apparatus in the above-described embodiment, the unit is not limited to the fixing device. For example, the unit may be a process unit, a transfer unit, a scanner unit, a conveyor unit, etc.

Although the first direction is a direction along the front-rear direction of the image forming apparatus 1 in the above-described embodiment, the first direction may be a direction different from the front-rear direction of the image forming apparatus 1. Further, although the second direction is a direction along the up-down direction of the image forming apparatus 1 in the above-described embodiment, the second direction may be a direction different from the up-down direction of the image forming apparatus 1.

Although the frame-side connector is configured as a movable connector movable in the main frame and the unit-side connector is configured as a fixed connector in the above-described embodiment, the unit-side connector may be the movable connector and the frame-side connector may be the fixed connector. Further, both of the frame-side connector and the unit-side connector may be the movable connector.

Although the guide pins are provided on the frame-side connector in the above-described embodiment, the guide pins may be provided on the unit-side connector. In this case, the guide holes are formed in the frame-side connector.

The image forming apparatus is not limited to a multicolor printer and may be any of a monochrome printer, a multifunctional device, or a copying machine. Although an electrophotographic image forming apparatus is illustrated in the above-described embodiment, the image forming apparatus may, for example, be an ink-jet image forming apparatus or the like.

The elements described in the above embodiment and its modified examples may be implemented selectively and in combination.

What is claimed is:

1. An image forming apparatus, comprising:
a main frame that comprises:
a first guide that extends in a first direction;
a second guide that extends diagonally from the first guide, the second guide having a proximal end located closer to the first guide and a distal end located farther away from the first guide, the distal end of the second guide being located on one side in a second direction perpendicular to the first direction with respect to the first guide;
a groove recessed from the second guide and having a bottom, the bottom of the groove being located on another side in the second direction with respect to the distal end of the second guide; and
a frame-side connector movably held by the main frame; and
a unit installable in an installation position in the main frame from outside of the main frame, the unit comprising:
a first reference portion that is received in the groove in a state where the unit is located in the installation position; and
a unit-side connector configured to be connected with the frame-side connector in a state where the unit is located in the installation position,
wherein the unit is installed in the main frame by:
a first process in which the first reference portion moves from one side in the first direction to another side in the first direction while being guided by the first guide;
a second process following the first process, in which the first reference portion moves toward the one side in the second direction while being guided by the second guide; and
a third process following the second process, in which the first reference portion moves toward the another side in the second direction into the groove and the unit is located in the installation position, and
wherein the unit-side connector engages the frame-side connector in the first process, the frame-side connector moves as the unit-side connector moves in the second process, and the frame-side connector moves as the unit-side connector moves in the third process.

2. The image forming apparatus according to claim 1, wherein
the frame-side connector comprises:
a first connector housing holding a terminal therein; and
an engagement portion, and
the unit-side connector comprises:
a second connector housing holding a terminal therein and configured to interfit with the first connector housing in a state where the unit is installed in the main frame; and
a to-be engaged portion configured to be engaged with the engagement portion, the to-be engaged portion being engaged with the engagement portion before the second connector housing interfits with the first connector housing when the unit is being installed into the main frame.

3. The image forming apparatus according to claim 2, wherein
the engagement portion is a guide pin protruding toward the one side in the first direction, an end of the guide pin being located further toward the one side in the first direction relative to the first connector housing, and
the to-be engaged portion is a guide hole in which the guide pin is to be inserted.

4. The image forming apparatus according to claim 1, wherein
the frame-side connector is configured to tilt such that a first surface of the frame-side connector facing the one side in the first direction faces the another side in the second direction, and
the frame-side connector is configured such that the first surface of the frame-side connector faces the first direction in the first process and tilts such that the first surface of the frame-side connector faces the another side in the second direction in the second process.

5. The image forming apparatus according to claim 4, wherein after the third process is completed and the unit is located in the installation position, the first surface of the frame-side connector faces the first direction.

6. The image forming apparatus according to claim 1, wherein the unit-side connector is electrically connected to the frame-side connector in the second process.

7. The image forming apparatus according to claim 1, wherein the main frame further comprises a third guide that extends in the first direction, the unit further comprises a second reference portion, and the unit moves with the second reference portion being guided by the third guide in the first process, and rotates about the second reference portion in the second process.

8. The image forming apparatus according to claim 1, wherein the first guide has a first guide surface facing upward, the second guide has a second guide surface facing diagonally upward, and the unit moves in the first direction as the first reference portion slides along the first guide surface in the first process, the first reference portion moves diagonally upward as the first reference portion slides along the second guide surface in the second process, and the unit is located in the installation position as the first reference portion is received in the groove and moves downward in the third process.

9. The image forming apparatus according to claim 1, wherein the unit is a fixing device comprising a heating member including a heater, and a pressure member configured to nip a sheet in combination with the heating member.

10. An image forming apparatus, comprising:

a main frame that comprises a frame-side connector; and a unit installable in an installation position in the main frame from outside of the main frame, the unit comprising a unit-side connector connected to the frame-side connector in a state where the unit is located in the installation position, wherein the frame-side connector and the unit-side connector are opposed in a first direction and are engaged with each other in a process in which the unit is installed into the main frame, wherein one of the frame-side connector and the unit-side connector is a movable connector, and another of the frame-side connector and the unit-side connector is a fixed connector, and one of the main frame and the unit provided with the movable connector comprises:

a first restriction portion facing upstream in an installation direction of the fixed connector, the first restriction portion configured to contact the movable connector and to restrict a range of movement of the movable connector;

a second restriction portion facing a second direction perpendicular to the first direction, the second restriction portion configured to contact the movable connector and to restrict a range of movement of the movable connector; and a spring configured to bias the movable connector toward the first restriction portion and toward the second restriction portion, and wherein the movable connector is configured to tilt such that the movable connector moves away from the first restriction portion in the first direction.

11. The image forming apparatus according to claim 10, wherein a dimension of the movable connector in the second direction is greater than a dimension of the movable connector in a third direction perpendicular to the first direction and to the second direction.

12. The image forming apparatus according to claim 10, wherein the movable connector is configured to contact the first restriction portion and the second restriction portion before the unit is installed into the main frame, and the movable connector is configured to be separated from at least one of the first restriction portion and the second restriction portion in the process in which the unit is installed into the main frame.

13. The image forming apparatus according to claim 12, wherein the one of the main frame and the unit further comprises a third restriction portion spaced apart from the movable connector in the second direction in a state where the movable connector is in contact with the second restriction portion.

14. The image forming apparatus according to claim 10, wherein the movable connector is configured to tilt such that a portion of the movable connector distant from the second restriction portion in the second direction moves away from the first restriction portion in the first direction.

15. The image forming apparatus according to claim 14, wherein the one of the main frame and the unit further comprises a fourth restriction portion that is spaced apart from the portion of the movable connector distant from the second restriction portion in the second direction, to one side in the first direction, in a state where the movable connector is in contact with the first restriction portion.

16. The image forming apparatus according to claim 15, wherein the movable connector comprises a hook portion to which the spring is hooked, the hook portion being located farther from the second restriction portion than from a central portion of the movable connector in the second direction.

17. The image forming apparatus according to claim 10, wherein the movable connector comprises:

a connector housing configured to hold a terminal; and two engagement portions located on both sides of the connector housing and configured to engage the fixed connector.

18. The image forming apparatus according to claim 10, wherein the one of the main frame and the unit further comprises:

a fifth restriction portion configured to contact the movable connector from one side in a third direction perpendicular to the first direction and to the second direction and to restrict a range of movement of the movable connector; and a sixth restriction portion configured to contact the movable connector from another side in the third direction and to restrict a range of movement of the movable connector, and a distance from the fifth restriction portion to the sixth restriction portion is greater than a dimension of the movable connector in the third direction.

19. The image forming apparatus according to claim 10, wherein the movable connector is provided at the main frame.

20. The image forming apparatus according to claim 10, wherein the unit is a fixing device comprising a heating member including a heater, and a pressure member configured to nip a sheet in combination with the heating member.

* * * * *